US007090580B2

(12) United States Patent
Rodgers et al.

(10) Patent No.: US 7,090,580 B2
(45) **Date of Patent: *Aug. 15, 2006**

(54) GAMING DEVICE INCLUDING A GAME HAVING A WILD SYMBOL RELATED AWARD

(75) Inventors: Paulina Rodgers, Reno, NV (US); Erick T. Ching, Reno, NV (US); Jasonlee Kissee Hohman, Sparks, NV (US)

(73) Assignee: IGT, Reno, NV (US)

( * ) Notice: Subject to any disclaimer, the term of this patent is extended or adjusted under 35 U.S.C. 154(b) by 358 days.

This patent is subject to a terminal disclaimer.

(21) Appl. No.: 10/633,391

(22) Filed: Jul. 31, 2003

(65) Prior Publication Data

US 2004/0072612 A1 Apr. 15, 2004

Related U.S. Application Data

(63) Continuation-in-part of application No. 10/241,255, filed on Sep. 11, 2002.

(51) Int. Cl.
*A63F 13/00* (2006.01)

(52) U.S. Cl. ........................................................ 463/20

(58) Field of Classification Search .................. 463/16, 463/20; 273/143 R
See application file for complete search history.

(56) References Cited

U.S. PATENT DOCUMENTS 4,198,052 A 4/1980 Gauselmann
4,448,419 A 5/1984 Telnaes
4,838,552 A 6/1989 Hagiwara
4,991,848 A 2/1991 Greenwood et al.
5,085,436 A 2/1992 Bennett
5,102,134 A 4/1992 Smyth
5,308,065 A 5/1994 Bridgeman et al.
5,332,228 A 7/1994 Schultz
5,393,057 A 2/1995 Marnell, II
5,393,061 A 2/1995 Manship et al.
5,407,200 A 4/1995 Zalabak
5,423,539 A 6/1995 Nagao (Continued)

FOREIGN PATENT DOCUMENTS

AU 199717601 B2 11/1997

(Continued)

OTHER PUBLICATIONS

Black Swan Paytable Display written by IGT, published prior to 2001.

(Continued)

*Primary Examiner*—Kim Nguyen
(74) *Attorney, Agent, or Firm*—Bell, Boyd & Lloyd LLC

(57) ABSTRACT

A gaming device including a plurality of reels having several symbols with at least one wild symbol. In one embodiment, the gaming device spins the reels for at one spin. If a wild symbol is indicated on a payline associated with the reels and no winning symbol combinations are indicated on the payline, the gaming device holds the reel including the wild symbol, stationary. The gaming device then re-spins the other reels for a designated number of spins, not including the reel having the wild symbol, in the game. The gaming device provides an award associated with any winning symbol combinations on the payline. In another embodiment, the gaming device holds one of the reels stationary when a wild symbol is indicated on a payline associated with the reels the award amounts associated with any indicated winning symbol combinations on the payline are less than a designated award value.

54 Claims, 31 Drawing Sheets

U.S. PATENT DOCUMENTS

| | | | |
|---|---|---|---|
| 5,431,408 | A | 7/1995 | Adams |
| 5,449,173 | A | 9/1995 | Thomas et al. |
| 5,542,669 | A | 8/1996 | Charron et al. |
| 5,560,603 | A | 10/1996 | Seelig et al. |
| 5,569,084 | A | 10/1996 | Nicastro et al. |
| 5,647,798 | A | 7/1997 | Falciglia |
| 5,722,891 | A | 3/1998 | Inoue |
| 5,772,506 | A | 6/1998 | Marks et al. |
| 5,775,692 | A | 7/1998 | Watts et al. |
| 5,810,361 | A | 9/1998 | Kadlic |
| 5,823,873 | A | 10/1998 | Moody |
| 5,833,537 | A | 11/1998 | Barrie |
| 5,855,514 | A | 1/1999 | Kamille |
| 5,918,880 | A | 7/1999 | Voigt, IV et al. |
| 5,935,002 | A | 8/1999 | Falciglia |
| 5,964,463 | A | 10/1999 | Moore, Jr. |
| 5,971,849 | A | 10/1999 | Falciglia |
| 5,988,638 | A | 11/1999 | Rodesch et al. |
| 6,003,867 | A | 12/1999 | Rodesch et al. |
| 6,004,207 | A | 12/1999 | Wilson, Jr. et al. |
| 6,012,982 | A | 1/2000 | Piechowiak et al. |
| 6,033,307 | A | 3/2000 | Vancura |
| 6,059,289 | A | 5/2000 | Vancura |
| 6,059,658 | A | 5/2000 | Mangano et al. |
| 6,089,977 | A | 7/2000 | Bennett |
| 6,102,400 | A | 8/2000 | Scott et al. |
| 6,120,031 | A | 9/2000 | Adams |
| 6,142,873 | A | 11/2000 | Weiss et al. |
| 6,142,874 | A | 11/2000 | Kodachi et al. |
| 6,142,875 | A | 11/2000 | Kodachi et al. |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,173,955 | B1 | 1/2001 | Perrie et al. |
| 6,174,233 | B1 | 1/2001 | Sunaga et al. |
| 6,186,894 | B1 | 2/2001 | Mayeroff |
| 6,190,254 | B1 | 2/2001 | Bennett |
| 6,203,429 | B1 | 3/2001 | Demar et al. |
| 6,220,959 | B1 | 4/2001 | Holmes, Jr. et al. |
| 6,224,483 | B1 | 5/2001 | Mayeroff |
| 6,231,442 | B1 | 5/2001 | Mayeroff |
| 6,231,445 | B1 | 5/2001 | Acres |
| 6,234,897 | B1 | 5/2001 | Frohm et al. |
| 6,251,013 | B1 | 6/2001 | Bennett |
| 6,270,409 | B1 | 8/2001 | Shuster |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,305,686 | B1 | 10/2001 | Perrie et al. |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,319,124 | B1 | 11/2001 | Baerlocher et al. |
| 6,322,078 | B1 | 11/2001 | Adams |
| 6,340,158 | B1 | 1/2002 | Pierce et al. |
| 6,358,144 | B1 | 3/2002 | Kadlic et al. |
| 6,364,768 | B1 | 4/2002 | Acres et al. |
| 6,375,570 | B1 | 4/2002 | Poole |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,413,162 | B1 | 7/2002 | Baerlocher et al. |
| 6,419,579 | B1 | 7/2002 | Bennett |
| 6,439,943 | B1 | 8/2002 | Aoki et al. |
| 6,439,993 | B1 | 8/2002 | O'Halloran |
| 6,443,452 | B1 | 9/2002 | Brune |
| 6,454,266 | B1 | 9/2002 | Breeding et al. |
| 6,461,241 | B1 | 10/2002 | Webb et al. |
| 6,471,208 | B1 | 10/2002 | Yoseloff et al. |
| 6,481,713 | B1 | 11/2002 | Perrie et al. |
| 6,491,584 | B1 | 12/2002 | Graham et al. |
| 6,494,454 | B1 | 12/2002 | Adams |
| 6,537,150 | B1 | 3/2003 | Luciano et al. |
| 6,537,152 | B1 | 3/2003 | Seelig et al. |
| 6,561,904 | B1 | 5/2003 | Locke et al. |
| 6,565,436 | B1 | 5/2003 | Baerlocher |
| 6,602,137 | B1 | 8/2003 | Kaminkow et al. |
| 6,604,740 | B1 | 8/2003 | Singer et al. |
| 6,616,142 | B1 | 9/2003 | Adams |
| 6,632,139 | B1 | 10/2003 | Baerlocher |
| 6,712,694 | B1 | 3/2004 | Nordman |
| 6,733,389 | B1 | 5/2004 | Webb et al. |
| 6,805,349 | B1 | 10/2004 | Baerlocher et al. |
| 6,869,360 | B1 | 3/2005 | Marks et al. |
| 6,905,406 | B1 | 6/2005 | Kaminkow et al. |
| 6,913,532 | B1 | 7/2005 | Baerlocher et al. |
| 6,921,335 | B1 | 7/2005 | Rodgers et al. |
| 2001/0009865 | A1 | 7/2001 | Demar et al. |
| 2002/0010017 | A1 | 1/2002 | Bennett |
| 2003/0060272 | A1 | 3/2003 | Glavich et al. |
| 2003/0069062 | A1 | 4/2003 | Shimizu |
| 2003/0073483 | A1 | 4/2003 | Glavich et al. |
| 2003/0162585 | A1 | 8/2003 | Bigelow et al. |
| 2003/0203753 | A1 | 10/2003 | Muir et al. |
| 2004/0002372 | A1 | 1/2004 | Rodgers et al. |
| 2004/0038731 | A1 | 2/2004 | Englman |
| 2004/0048652 | A1* | 3/2004 | Ching et al. .................. 463/20 |
| 2004/0053666 | A1 | 3/2004 | Vancura |
| 2004/0053669 | A1 | 3/2004 | Gerrard et al. |
| 2004/0053672 | A1 | 3/2004 | Baerlocher |
| 2004/0072612 | A1 | 4/2004 | Rodgers et al. |
| 2004/0137982 | A1 | 7/2004 | Cuddy et al. |
| 2004/0147306 | A1 | 7/2004 | Randall et al. |
| 2004/0266516 | A1 | 12/2004 | Bleich et al. |
| 2004/0266517 | A1 | 12/2004 | Thomas |
| 2005/0049035 | A1 | 3/2005 | Baerlocher et al. |
| 2005/0070354 | A1 | 3/2005 | Baerlocher et al. |

FOREIGN PATENT DOCUMENTS

| | | | |
|---|---|---|---|
| AU | 199917318 | A1 | 9/1999 |
| EP | 0 874 337 | A1 | 10/1998 |
| EP | 0 981 119 | A2 | 2/2000 |
| EP | 0984408 | A2 | 3/2000 |
| EP | 1 513 117 | A2 | 3/2005 |
| GB | 2 322 217 | A | 8/1998 |
| WO | WO 9732285 | | 9/1997 |
| WO | WO 00/32286 | | 6/2000 |
| WO | WO 00/66235 | | 11/2000 |
| WO | WO 00/76606 | A1 | 12/2000 |
| WO | WO 01/26019 | A1 | 4/2001 |
| WO | WO 2004/025584 | A2 | 3/2004 |

OTHER PUBLICATIONS

Boot Scootin Article written by Strictly Slots/Aristocrat Leisure Industries, PTY Ltd., published date unknown.

Break the Spell Advertisement written by Atronic Casino Technology, Ltd., published in 1999.

Break the Spell Article written by Strictly Slots/Atronic Casino Technology, Ltd., published in Sep. 2000.

Break the Spell Atronic Web Page, published in Jan. 2001.

Break the Spell Brochure, published in 1999.

Cash Chameleon Article written by Strictly Slots/Aristocrat Leisure Industries, PTY Ltd., published in Apr. 2001.

Cossack Dancer Advertisement written by Olympic Video Gaming, published prior to 2002.

Description of Symbol Feature in Australian UFO Gaming Machine written by Barcrest Ltd., published in 1995.

Enchanted Forest™ Gaming Description from Aristocrat, available in 1994.

Enchanted Unicorn Advertisement written by IGT, published in 2001.
Field Testing New Slots Article, written by Strictly Slots, published in Jul. 2000.
Fishin' Buddies Article published in Strictly Slots/Anchor Games, published in Apr. 2001.
Happy Camper Advertisement written by IGT, published in 2001.
Introducing the "Smiling Ape" Machine Advertisement (including Joker's Wild Poker description) written by IGT, published prior to 2001.
Jackpot Party Brochure and Articles written by WMS Gaming, Inc, published in 1988.
Joker's Wild Advertisement written by IGT, published prior to 2001.
Little Green Men, Jr. Brochure written by A.C. Coin and Slot Services Company, published prior to 2002.
Loco Loot Article written by Strictly Slots/Aristocrat Leisure Industries, PTY Ltd., published in May 2002.
Penguin Pays Advertisement written by Aristocrat Incorporated, published in 1998.
Reel Magic™ Gaming Machine Description written by IGT, available in 1986.
The Basics of Winning Video Poker (Chapter VI Deuces Wild & Chapter VII Jokers Wild) written by J. Edward Allen, published in 1990.
The Latest Buzz Article written by Bally Gaming Systems, published in Fall 2000.
Wild Streak Advertisement written by Strictly Slots/WMS Gaming, Inc., published in Mar. 2001.
Your Real Key to Gaming Success Advertisement (including Roll Over Beethoven and Wild Fortune) written by Olympic Video Gaming, published date unknown.
Catch A Wave Advertisement written by IGT, published in Dec. 2000.
Double Diamond Line Advertisement written by Bally Gaming Systems, published in 2000.
Mountain Money Article written by Strictly Slots/Aristocrat Leisure Industries, PTY Ltd., published in Jun. 2002.
On the House Advertisement written by Olympic Video Gaming, published prior to 2002.
Wild Bear Salmon Run Advertisement written by IGT, published in 2003.
Dolphin Treasure Advertisement written by Aristocrat Leisure Industries Pty., Ltd., published in 1996.
Spin Til You Win Game Description written by IGT, published in 1996.
Family Feud Bullseye Advertisement, printed from: www.igtonline.com /megajackpots/new_games/family_feud_bullseye_slots.html on Mar. 2, 2005.

* cited by examiner

| SYMBOL COMBINATION | AWARD |
|---|---|
| AAA | 10,000 |
| BBB | 1000 |
| CCC | 500 |
| DDD | 100 |
| EEE | 75 |
| FFF | 50 |
| GGG | 25 |
| HHH | 10 |
| WILD WILD WILD | 10 |
| ◇ ◇ ◇ | 5 |

FIG. 4A

| SYMBOL COMBINATION | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|
| AAA | 1/20 | 1/20 | 1/20 | 1/8000 |
| BBB | 1/20 | 1/20 | 1/20 | 1/8000 |
| CCC | 1/20 | 1/20 | 1/20 | 1/8000 |
| DDD | 1/20 | 1/20 | 1/20 | 1/8000 |
| EEE | 1/20 | 1/20 | 1/20 | 1/8000 |
| FFF | 1/20 | 1/20 | 1/20 | 1/8000 |
| GGG | 1/20 | 1/20 | 1/20 | 1/8000 |
| HHH | 1/20 | 1/20 | 1/20 | 1/8000 |
| WILD WILD WILD | 1/20 | 1/20 | 1/20 | 1/8000 |
| ◇ ◇ ◇ | 1/20 | 1/20 | 1/20 | 1/8000 |
| ▭ ▭ ▭ | 10/20 | 10/20 | 10/20 | 1/8 |

FIG. 4B

| SYMBOL | PROBABILITY OF THE TRIGGER SYMBOL | PROBABILITY OF A SYMBOL ON REEL 1 | PROBABILITY OF A SYMBOL ON REEL 2 | PROBABILITY OF A SYMBOL ON REEL 3 | PROBABILITY TOTAL |
|---|---|---|---|---|---|
| A | 1/20 | | 1/9 | | 1/180 |
| B | 1/20 | | 1/9 | | 1/180 |
| C | 1/20 | | 1/9 | | 1/180 |
| D | 1/20 | | 1/9 | | 1/180 |
| E | 1/20 | | 1/9 | | 1/180 |
| F | 1/20 | | 1/9 | | 1/180 |
| G | 1/20 | | 1/9 | | 1/180 |
| H | 1/20 | | 1/9 | | 1/180 |
| WILD | 1/20 | | 1/9 | | 1/180 |

GAMING DEVICE INCLUDING A GAME HAVING A WILD SYMBOL RELATED AWARD

PRIORITY CLAIM

This application is a continuation-in-part of and claims the benefit of U.S. patent application Ser. No. 10/241,255 filed Sep. 11, 2002.

CROSS REFERENCE TO RELATED APPLICATIONS

This application is related to the following commonly-owned patent applications: "GAMING DEVICE HAVING A RE-TRIGGER SYMBOL BONUS SCHEME," Ser. No. 09/981,133, now U.S. Pat. No. 6,913,532; "GAMING DEVICE HAVING DUAL EVALUATION SCHEME," Ser. No. 09/687,689; "GAMING DEVICE HAVING REGENERATING MULTIPLE AWARD OPPORTUNITIES," Ser. No. 09/960,784; "GAMING DEVICE HAVING TRANSFORMABLE WILD SYMBOLS OR CARDS WITH WILD SIGNAL INDICATORS," Ser. No. 09/957,305, now U.S. Pat. No. 6,780,109; "GAMING DEVICE HAVING WILD INDICATORS," Ser. No. 09/960,883; "GAMING DEVICE WITH WILD ACTIVATION SYMBOLS AND WILD TERMINATION SYMBOLS," Ser. No. 09/964,102, now U.S. Pat. No. 6,805,349; "GAMING DEVICE HAVING FREE GAMES BONUS WITH A CHANGING MULTIPLIER," Ser. No. 10/086,146; "GAMING DEVICE HAVING A VARIED WILD SYMBOL IN A BONUS GAME," Ser. No. 10/243,512; "GAMING DEVICE HAVING A BONUS GAME WITH MULTIPLE PLAYER SELECTABLE AWARD OPPORTUNITIES," Ser. No. 10/237,207; "GAMING DEVICE HAVING A RE-TRIGGERING SYMBOL BONUS SCHEME WITH A BONUS SYMBOL ACCUMULATOR," Ser. No. 10/071,441; "GAMING DEVICE HAVING RESULTANT WILD SYMBOLS," Ser. No. 10/191,154; "GAMING DEVICE HAVING EXTENDER SYMBOLS," Ser. No. 10/191,197; "GAMING DEVICE INCLUDING A GAME HAVING PLAYER SELECTED FUNCTION BASED ON SYMBOLS IN A FREE SPINS GAME," Ser. No. 10/243,052; "GAMING DEVICE HAVING A PROBABILITY ENHANCING TRIGGER SYMBOL," Ser. No. 10/241,255; "GAMING DEVICE HAVING A PROBABILITY-ENHANCING TRIGGER SYMBOL," Ser. No. 10/661,443; "GAMING DEVICE HAVING A BONUS GAME WITH MULTIPLE PLAYER SELECTABLE AWARD OPPORTUNITIES," Ser. No. 10/660,076; "GAMING DEVICE HAVING SEQUENTIAL ACTIVATIONS OF A GAME AND REPLAY OF PREVIOUS ACTIVATIONS OF THE GAME," Ser. No. 10/956,508; "GAMING DEVICE WITH CHANGING WILD SYMBOLS," Ser. No. 10/956,303; "GAMING DEVICE HAVING FREE SPIN MODE WITH SYMBOL ELIMINATION," Ser. No. 10/953,818; "GAMING DEVICE HAVING A FREE SPIN GAME," Ser. No. 10/953,812; "GAMING DEVICE HAVING A RE-TRIGGERING SYMBOL BONUS SCHEME WITH A BONUS SYMBOL ACCUMULATOR AND PLAYER SELECTION OF ACCUMULATION TOTAL," Ser. No. 10/952,656; "GAMING DEVICE HAVING TRANSFORMABLE WILD SYMBOLS OR CARDS WITH WILD SIGNAL INDICATORS," Ser. No. 10/920,798; "GAMING DEVICE HAVING WILD INDICATORS," Ser. No. 11/015,842; "GAMING DEVICE HAVING WILD INDICATORS," Ser. No. 10/982,096; "GAMING DEVICE WITH WILD ACTIVATION SYMBOLS AND WILD TERMINATION SYMBOLS." Ser. No. 10/966,223; and "GAMING DEVICE HAVING A RE-TRIGGER SYMBOL BONUS SCHEME," Ser. No. 11/156,112.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players have more opportunities to receive an award.

In known gaming devices, however, the probability of obtaining the largest award (i.e., the jackpot award) is typically much lower than the probability of obtaining the other awards in a game. Thus, although a player may obtain more awards in a game, these awards are generally the relatively small awards and not the relatively large awards such as the jackpot award.

Many jurisdictions have regulations that prohibit changing the probability of occurrence associated with the reel symbols. This makes it more difficult to create bonus or secondary games with high payouts using the bonus game reels and reel symbols.

Additionally, many known gaming devices provide wild symbols or wild cards to enhance a player's opportunity of receiving awards in a game. In a reel game, wild symbols provide a player with an additional opportunity or opportunities to obtain winning symbol combinations on the reels. Therefore, wild symbols, wild cards and wild indicators in gaming devices provide additional excitement and entertainment for players.

In a slot machine having reels, a wild symbol can enable the matching of one or more symbols on a payline to achieve a symbol combination. For example in FIG. 8, a gaming device including a game having three reels is displayed to a player. In the game, a winning combination of symbols includes three matching symbols in the game. As illustrated in FIG. 8, in one of the activations or spins of the reels, a star symbol, a wild symbol and a circle symbol are indicated on the reels. The wild symbol matches one of the symbols on the same payline, payline **56*b*, as the wild symbol. Therefore, the indicated symbol combination on payline 56*b* is either two star symbols or two circle symbols. In this example, neither of these symbol combinations are winning symbol combinations. Therefore, the player obtained a wild symbol on the reels but did not obtain a winning symbol combination in the game as indicated by the game display 200 and the total award display 202**. Because the probability of obtaining a winning symbol combination increases when a wild symbol occurs on one or more of the reels in a game, a player's excitement and enjoyment also increases in the game. However, when the player does not obtain a winning symbol combination after obtaining a wild symbol in the game, the player's excitement level decreases. Therefore, a game that provides additional award opportunities related to a wild symbol is desirable.

Gaming devices that increase the probability of obtaining the relatively large award and specifically, the jackpot award, are desirable. Additionally, gaming devices that increase the opportunities of obtaining an award or awards in a game are desirable. To increase player enjoyment and excitement, it is desirable to provide new games and gaming devices which increase the likelihood or probability that the player will obtain one or more awards in a game and specifically, one or more relatively large awards in a game.

SUMMARY OF THE INVENTION

The present invention is directed to a gaming device including an award mode of a primary game or bonus game where the probability of obtaining an award and specifically, a relatively large award increases when the player enters the award mode or bonus game.

In one embodiment, the gaming device includes a plurality of reels, each having a plurality of symbols. These symbols include a plurality of award symbols, at least one non-award symbol or null symbol or blank, at least one trigger symbol or symbol combination and at least one wild symbol. One or more paylines are associated with the reels to indicate symbols or symbol combinations on the reels, which are evaluated for winning symbol combinations. The symbols may be any suitable symbols such as letters, numbers, characters or any other suitable images. The award mode also includes a triggering event, which in one embodiment, includes a trigger symbol occurring on the reels. In one embodiment, the triggering event occurs when the trigger symbol is indicated on a designated reel on one of the paylines associated with the reels. In another embodiment, the triggering event occurs when the trigger symbol occurs on any of the paylines.

In a primary game, the gaming device initiates the award mode when the triggering event occurs in the game. In the award mode, the gaming device holds the reel including the trigger symbol stationary while activating or spinning the other reels until those reels indicate a wild symbol on the payline. The gaming device then holds the reels including the wild symbols stationary while reactivating or re-spinning the reel including the trigger symbol. Thus, the award mode effectively reduces the game to a single reel game where only one of the award symbols on the reel indicates a winning symbol combination in the award mode.

In the award mode, the gaming device re-activates or re-spins the reel including the trigger symbol until one of the award symbols is indicated on the payline on that reel. For instance, if a non-award or null symbol, or the trigger symbol is indicated on the payline in the award mode, the gaming device re-spins the reel until one of the award symbols or the wild symbol is indicated on the payline. The null symbols and the trigger symbol do not provide an award to the player in the award mode, but instead cause the gaming device to re-spin the reels. Therefore, the player is guaranteed to receive one of the award symbols or the wild symbol in the award mode before the award mode ends. Reducing the number of symbols that may be indicated on the payline to end the game, increases the probability that any one of the award symbols will be indicated on the payline. The gaming device then provides the award associated with the indicated award symbol or the indicated award symbol combination to the player. The award is added to the player's total award in a total award display and the bonus mode ends. In another embodiment, the player continues to re-activate the reels in the award mode if the player has spins remaining in the award mode.

The gaming device of the present invention effectively reduces the game to a single reel game or event which increases the probability or chance that a player will obtain an award in the award mode and specifically that the player will obtain a relatively large award such as jackpot award in the award mode. For example, in a three reel slot game, if each of the reels in the game includes twenty symbols including the trigger symbol, wild symbol and non-award or null symbols, the probability or chance of obtaining an award symbol combination in that game is (1/20)×(1/20)×(1/20) or 1 in 8000.

In the award mode the game is reduced to a single reel game as described above. Therefore, the probability of obtaining an award symbol (or symbol combination) in the award mode significantly increases. The probability is determined by multiplying the probability of the trigger symbol being indicated in the primary game (i.e., 1 in 20) by the probability of indicating one of the award symbols occurring in the award mode (i.e., 1 in 9). Therefore, the probability of one of the award symbols (or symbol combinations) being indicated in the game (through the award mode) is (1/20)×(1/9), which equals a probability of (1/180). Thus, it is significantly more likely that the player will obtain one of the award symbols and therefore a winning award symbol combination in game through the award mode. This increases the player's excitement and enjoyment of the game because the player has a greater opportunity or probability of obtaining the relatively large award or jackpot award in the award mode.

In one embodiment, a probability of being indicated on the payline is associated with each of the symbols on the reels. In one aspect of this embodiment, the probability associated with the trigger symbol is less than the probability associated with at least one of the award symbols, null symbols and the wild symbol on the reels. In another aspect of this embodiment, the probability associated with the trigger symbol is less than a plurality of the probabilities associated with the award symbols, null symbols and the wild symbol. In a further aspect of this embodiment, the probability associated with the trigger symbol is less than all of the probabilities associated with the award symbols, null symbols and the wild symbol in the game.

Similarly in another embodiment, the award symbols include one relatively large award and several relatively small awards. In this embodiment, a probability of being indicated on the payline is associated with the award symbols such that the probability associated with the award symbol including the relatively large award is less than at least one of the probabilities associated with the award symbols including the relatively small awards being indicated on the payline. In another embodiment, the probability associated with the award symbol including the relatively large award is less than a plurality of the probabilities associated with the award symbols including the relatively small awards. In a further embodiment, the probability associated with the award symbol including the relatively large award is less than all of the probabilities associated with the award symbols including the relatively small awards.

In a further embodiment, the award mode of the present invention includes an award associated with a winning symbol combination including all wild symbols. In this embodiment, if the award mode is initiated and a wild symbol is indicated on the payline associated with the reels, in combination with the other wild symbols indicated on the payline, the gaming device provides the maximum or largest award in the game, such as the jackpot award. In another embodiment, the gaming device provides a predetermined award associated with a winning symbol combination including wild symbols in the game.

In an alternative embodiment, the gaming device includes a game which displays a plurality of reels to a player. The reels include a plurality of symbols having at least one trigger symbol such as a wild symbol. The gaming device activates or spins the reels for at least one activation or spin in a game and indicates a combination of symbols on the reels. If the symbol combination indicated on the reels includes a wild symbol but is not a winning symbol combination in the game, the gaming device holds the reel including the wild symbol stationary. The gaming device then provides the player with a designated number of activations or spins to re-spin at least one of the reels other than the held reel in the game. The designated number of activations or spins may be predetermined, randomly determined, determined based on a wager made by a player or determined according to any suitable determination method in a game. The wild symbol and the symbol combinations may be indicated on one payline associated with the reels, a plurality of paylines associated with the reels or on all of the paylines associated with the reels.

In one embodiment, the gaming device re-activates or re-spins the reel or reels other than the reel including the wild symbol until a winning symbol combination is indicated on the reels or until there are no spins remaining in the game. In another embodiment, the gaming device re-activates or re-spins the reel or reels other than the reel including the wild symbol until a winning symbol combination is indicated on the reels. In a further embodiment, the gaming device re-activates or re-spins the reel or reels other than the reel including the wild symbol until there are no spins remaining in the game. In this embodiment, the gaming device provides the awards to the player associated with any winning symbol combinations that occur on the reels during the designated number of activations or spins of the reels.

In another alternative embodiment, if the symbol combination indicated on the reels includes a wild symbol but does not indicate a winning symbol combination having an award amount equal to or greater than a designated award amount in the game, the gaming device holds the reel including the wild symbol stationary. The gaming device then provides the player with a designated number of activations or spins to re-spin at least one of the reels other than the held reel in the game as described above. The gaming device then provides the player with an award or awards associated with any winning symbol combinations indicated on the reels in the game. The designated award amount may be an award value or values or any other suitable award level in the game. In addition, the designated award amount may be predetermined, randomly determined, determined based on a wager made by the player in the game or determined according to any suitable determination method.

In a further alternative embodiment, the present invention provides a gaming device including a free spins game which displays a plurality of reels to a player. The reels include a plurality of symbols where the symbols include at least one trigger symbol such as a wild symbol. The gaming device also provides a designated number of activations or spins of the reels in the game. The gaming device activates or spins the reels to indicate the symbols on the reels. If a wild symbol is indicated on the reels such as on a payline associated with the reels and no winning symbol combinations are indicated on the same payline as the wild symbol, the gaming device freezes or holds the reel including the wild symbol stationary. The gaming device then re-activates or re-spins the other reels, not including the reel including the wild symbol, to indicate symbols in the game. The gaming device continues to activate the other reels in the game for the remaining number of spins in the game until a winning symbol combination, if any, is indicated on the payline associated with the reels. The gaming device then provides an award associated with the winning symbol combination to the player. The game ends when there are no spins remaining in the game, the gaming device provides the player with the total award indicated in a total award display.

In another embodiment of the present invention, the gaming device freezes or holds the reel including the wild symbol stationary when the wild symbol is indicated on a payline associated with the reels and the award amounts associated with any winning symbol combinations indicated on the payline are less than a designated award amount. Thus, the gaming device ensures that if the player does obtain a winning symbol combination in the game, the award associated with that winning symbol combination will be equal to or greater than a designated minimum award or award amount in the game. The designated award amount may be any suitable level desired by game implementor.

In this embodiment, the gaming device activates or spins the reels for a designated number of spins in the game. If a wild symbol is indicated on a payline associated with the reels and the award value or amount associated with any indicated winning symbol combinations on the payline are less than the designated award value, the gaming device freezes or holds the reel including the wild symbol and enables the player to have an opportunity to obtain an award associated with a winning symbol combination in the game that is equal to or greater than the designated award value or amount. The gaming device continues to activate the reels, other than the reel including the wild symbol, to indicate symbols and possibly winning symbol combinations in the game. The gaming device then provides any awards associated with winning symbol combinations including the wild symbol on the payline that are equal to or greater than the designated award amount. The gaming device then transfers those awards to the total award display. When there are no spins remaining in the game, the game ends and the gaming device provides the total award to the player.

In a further alternative embodiment, the gaming device provides an award or awards to a player for any winning symbol combinations including the wild symbol which are located on any of the paylines associated with the reels (i.e., a scatter pay combination). In one embodiment, the winning symbol combination includes the wild symbol and any symbols located on the reels not including the wild symbol. In another embodiment, the winning symbol combination includes the wild symbol and any symbols included on any of the reels including the reel having the wild symbol. Thus, the gaming device provides the player with more opportunities to obtain a winning combination of symbols including the wild symbol in the game and thereby increases the player's chance of obtaining an award in the game.

In another alternative embodiment, one or more symbol indicators are associated with the wild symbol. In this embodiment, when the wild symbol is indicated on the reels, the reel including the wild symbol is held stationary while the other reels not including the wild symbol are activated. When the reels not including the wild symbol stop, the symbol indicator or indicators associated with the wild symbol indicate or point to one or more symbols on the reels. The symbol indicator or indicators may point to symbols on different reels or the same reel as the reel including the wild symbol. In one embodiment, the symbol indicator or indicators associated with the wild symbol point to a fixed location or locations on the reels. It should be appreciated that the symbol indicators may indicate or point to a randomly selected location on the reels or a designated section on the reels. The symbols indicated by the symbol indicators are combined with the wild symbol to form a symbol combination in an activation. The gaming device provides the player with any awards associated with the formed symbol combination.

In a further alternative embodiment, the symbols on the reels include at least one bonus symbol. If the bonus symbol is indicated on one or more designated paylines associated with the reels, the gaming device provides a bonus award or an additional award to the player in the game. The bonus award may include at least one free spin of the reels, at least one free game and/or at least one multiplier. It should be appreciated that the bonus award or additional award may be any suitable award as desired by the game implementor. The bonus symbol further enhances the probability that a player will obtain one of the winning symbol combinations in the game.

In another alternative embodiment, a probability of being indicated on a payline associated with the reels is associated with each of the symbols on the reels. In one aspect of this embodiment, the probability associated with the wild symbol is less than the probability associated with at least one of the other symbols on the reels. In another aspect of this embodiment, the probability associated with the wild symbol is less than the probability associated with a plurality of the other symbols on the reels. In a further aspect of this embodiment, the probability associated with the wild symbol is less than all of the probabilities associated with the other symbols on the reels.

In a further alternative embodiment, the present invention is employed in a card game In this embodiment, the gaming device displays a plurality of cards to a player in a game. The cards include a plurality of symbols including at least one trigger symbol such as a wild symbol. The symbols may be numbers, colors, letters, playing card suits, characters or any suitable image. In a game, the gaming device displays the cards in one or more rounds to the player. If a wild symbol appears on one of the cards and there is not a winning combination of cards, the gaming device holds the card including the wild symbol. The gaming device then replaces at least one of the cards not including the wild symbol for a designated number of rounds until a winning combination of cards are indicated or until there are no rounds remaining in the game. In another embodiment, the gaming device continues to replace at least one of the cards not including the wild symbol until a winning combination of cards are indicated. The gaming device then provides the player with the award associated with the winning combination of cards. In a further embodiment, the gaming device holds the card including the wild symbol when no winning combination of cards are indicated that include an award amount equal to or greater than a designated award amount in the game.

It should be appreciated that the present invention may be employed in a primary game, a bonus game, a sub-game or any suitable game.

It should also be appreciated that although the present application primarily discusses a trigger symbol, a combination of symbols (i.e., a trigger symbol combination) could be employed to trigger the award mode. It should also be appreciated that the trigger symbol could function as a wild symbol and one of the other reels could re-activated.

It is therefore an advantage of the present invention to provide a gaming device that increases the probability of obtaining awards in a game.

Another advantage of the present invention is to provide a gaming device that increases the probability of obtaining a relatively large award in a game.

It is a further advantage of the present invention to provide a gaming device that increases the probability of obtaining the jackpot award in a game.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4A is probability table illustrating the probability of each of the symbols being indicated on each of the reels in a primary game.

FIG. 4B is probability table illustrating the probability of each of the symbols being indicated on each of the reels in an award mode.

DETAILED DESCRIPTION OF THE INVENTION

Gaming Device and Electronics

Figure 1A:
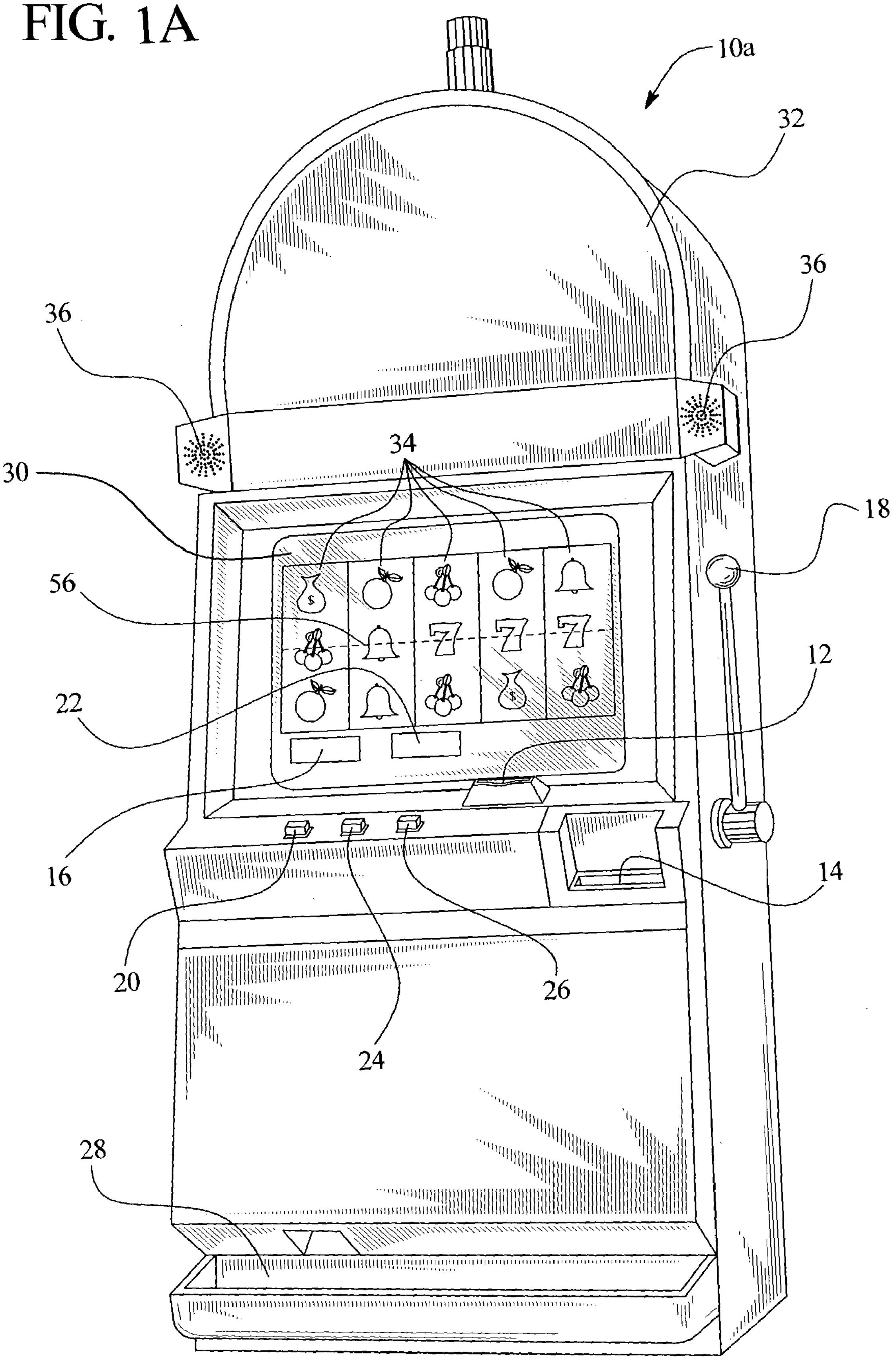
FIG. 1A is a front perspective view of one embodiment of the gaming device of the present invention.
Figure 1B:
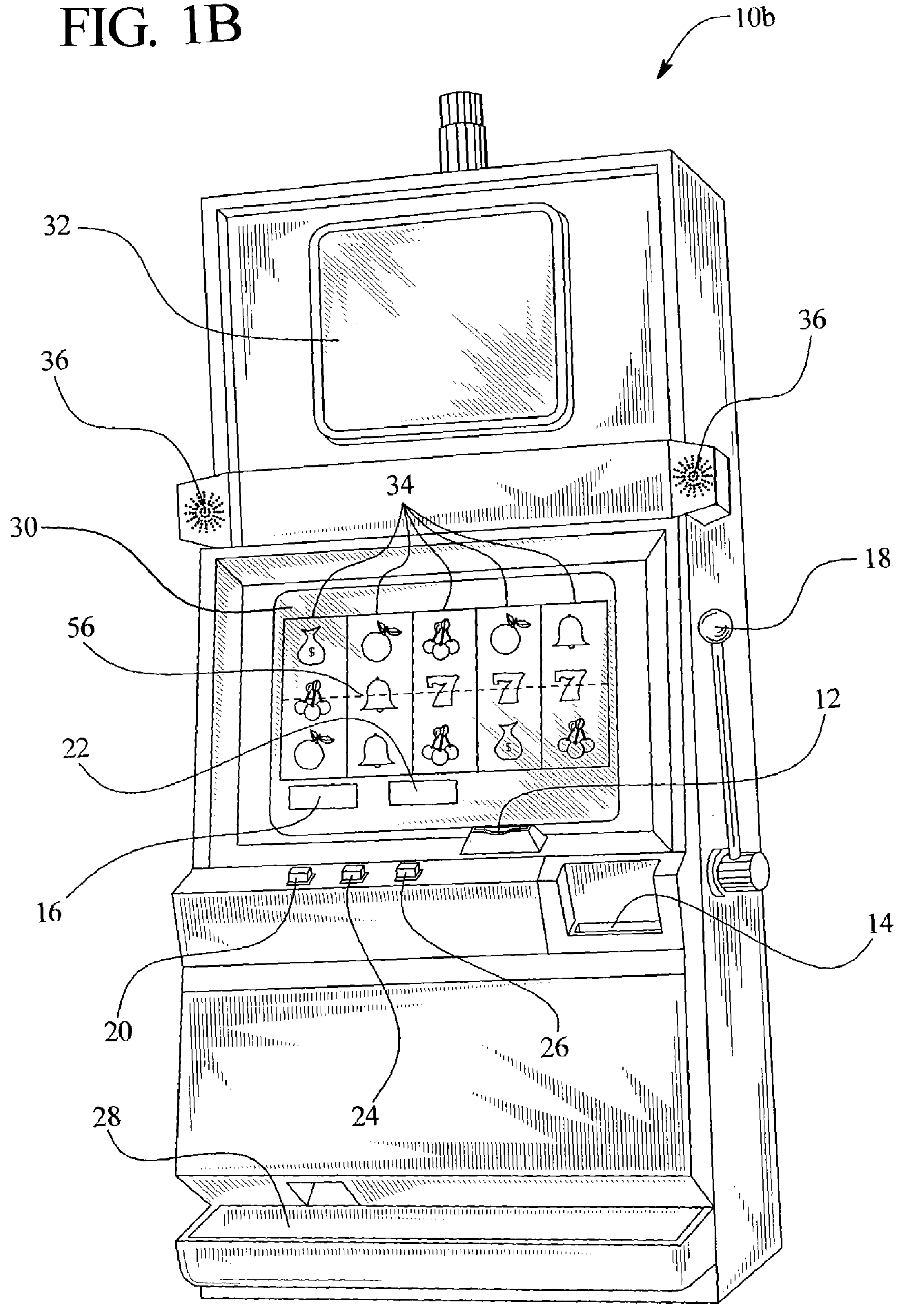
FIG. 1B is a front perspective view of another embodiment of the gaming device of the present invention.

Referring now to the drawings, two embodiments of the gaming device of the present invention are illustrated in FIGS. 1A and 1B as gaming device **10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10** can be implemented as a program code stored on a disk or other memory device which a player can use in a desktop or laptop personal computer or other computerized platform.

Gaming device 10 can incorporate any primary game such as slot, black jack, poker or keno, any of the bonus triggering events and any of the bonus round games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 displays a plurality of reels 34 such as three to five reels 34 in mechanical or video form at one or more of the display devices. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images, which preferably correspond to a theme associated with the gaming device 10. Furthermore, gaming device 10 preferably includes speakers 36 for making sounds or playing music.

Figure 2:
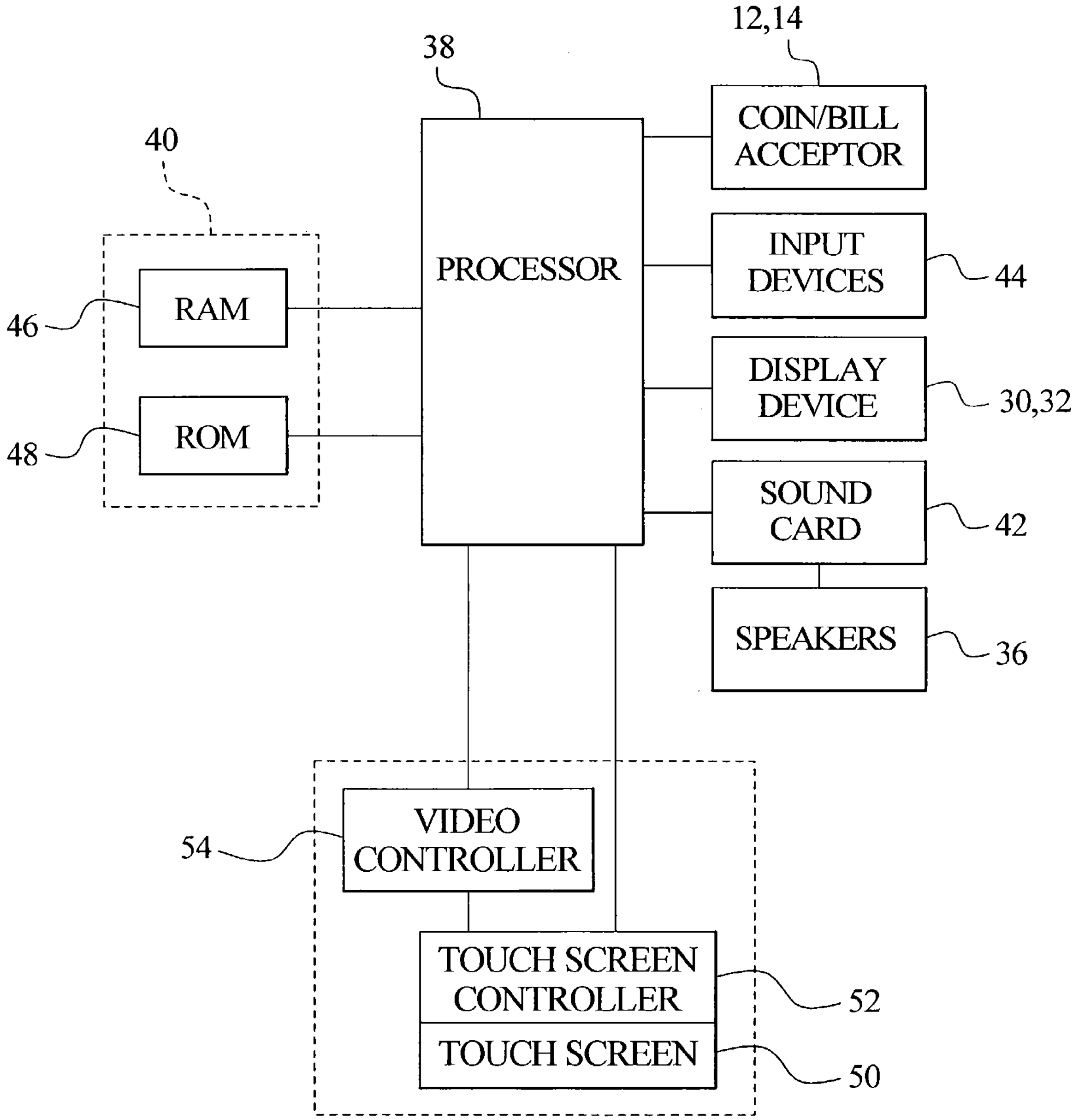
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 also gives players the opportunity to win credits in a bonus round. This type of gaming device 10 will include a program which will automatically initiates a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on one or more of a plurality of the reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Probability Enhancing Trigger Symbol

Referring to FIGS. 1C, 3A, 3B, 4A and 4B, one embodiment of the reels of the present invention is illustrated where three reels are employed in a game. It should be appreciated that any suitable number of reels may be employed in the primary game. In this embodiment, each of the reels 34*a*, 34*b* and 34*c* includes symbols 100, which are represented by letters A, B, C, D, E, F, G and H, non-award or null symbols or blanks 104, at least one trigger symbol 102 and at least one wild symbol 105. It should be appreciated that any suitable number and types of symbols may be employed in a game according to the present invention. Each symbol is positioned at a reel stop position or reel stop on each of the reels. Therefore, one of the symbols such as one of the award symbols, one of the null symbols, the trigger symbol or the wild symbol will be indicated on a payline in the game.

Figures 3A, 3B:
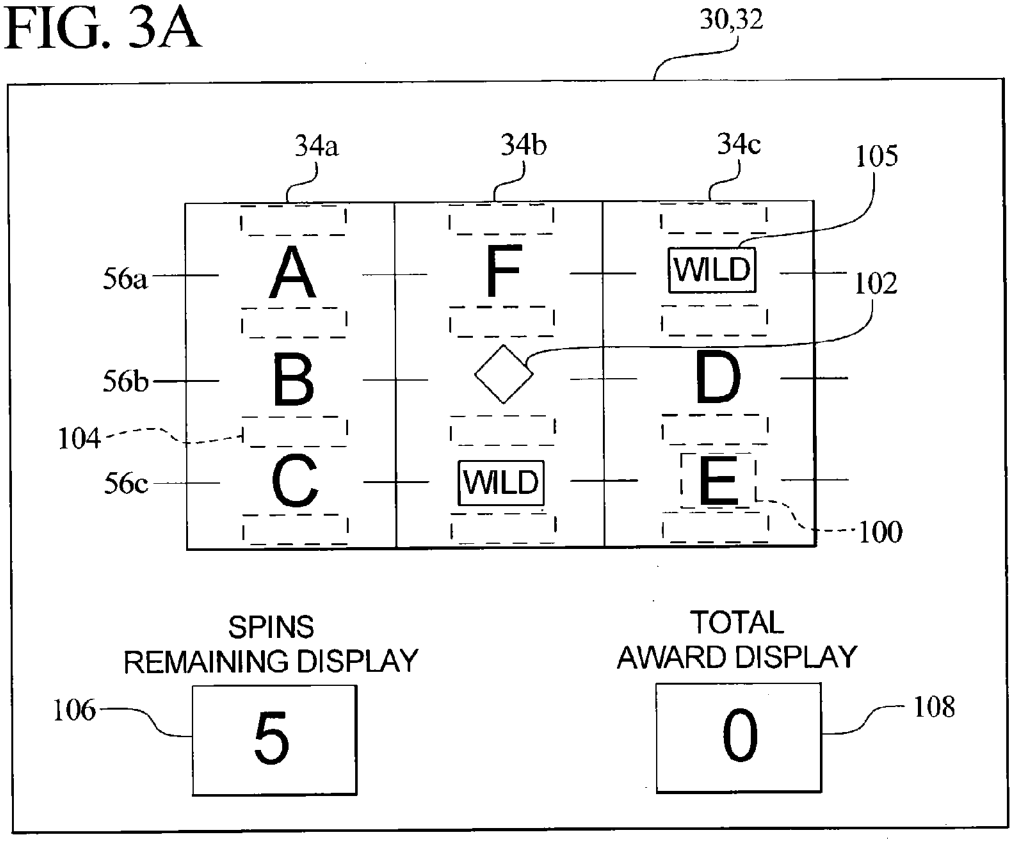
FIG. 3A is an enlarged elevation view of one of the display devices of FIGS. 1A and 1B illustrating one embodiment of the present invention.
FIG. 3B is an award table illustrating the symbol combinations and the awards associated with the symbols combinations of the embodiment of FIG. 3A.

Referring to FIG. 3A, in one embodiment the gaming device displays a plurality of reels and specifically three reels 34*a*, 34*b* and 34*c*. The reels include a plurality of symbols such as the letters A, B, C, D, E, F, G and H. The reels also include at least one trigger symbol, such as a diamond symbol 102. It should be appreciated that one or more of the reels may include at least on trigger symbol. Additionally, each of the reels includes at least one wild symbol 105 and at least one null symbol or blank 104. A probability of being indicated is associated with each of the symbols on the reels. In the primary game, the probability of each of the symbols being indicated on one of the reels is one in twenty (1/20) or 5.0% as shown in the probability table illustrated in FIG. 4A. If a triggering event occurs in the primary game, an award mode is initiated. In the award mode, the primary game is effectively reduced to a one-reel game. In addition, the null symbols 104 or blanks, and the trigger symbol, each re-spin or re-activate the reels. Thus, the effective number of symbols on the reels is reduced from twenty symbols to nine symbols, which further increases the probability that one of the symbols will be indicated on the reels. Several paylines, such as paylines 56*a*, 56*b* and 56*c* are associated with the reels. It should be appreciated that one or more paylines may be associated with the reels. A spins remaining display 106 indicates the number of spins remaining in the game. A total award display indicates the total value of the awards accumulated by the player in the game.

The gaming device provides the player with a number of spins in the game. The number of spins may be randomly determined, predetermined or determined in any suitable manner. The player uses the spins to activate or spin the reels 34*a*, 34*b* and 34*c*. The gaming device provides an award associated with one or more winning symbol combinations indicated on one of the paylines 56*a*, 56*b* or 56*c* associated with the reels. The player continues to spin the reels until the player has no spins remaining as indicated by the spins remaining display 106.

The trigger symbol or diamond symbol 102 increases the probability that the player will obtain one of the awards in the game and specifically increases the probability that the player will obtain the largest award such as the jackpot award in the game. The game preferably includes only one trigger symbol, designated as a diamond symbol 102, on one of the reels 34 in the game. In one embodiment, the middle reel 34*b*, includes the trigger symbol or diamond symbol 102. If the diamond symbol 102 is indicated on one of the paylines 56*a*, 56*b* or 56*c*, the gaming device initiates an award mode. In the award mode, the gaming device freezes or holds the reel 34*b* including the trigger symbol 102 stationary while the gaming device activates or spins the remaining reels or outside reels 34*a* and 34*c*, which are adjacent to the middle reel 34*b*. The gaming device activates or spins these reels until a wild symbol 105 is indicated on the same payline as the trigger symbol or diamond symbol 102.

Once the wild symbols 105 are indicated on reels 34*a* and 34*c* and on the same payline as the trigger symbol 102, the gaming device holds or keeps these reels stationary. The symbols on payline 56*b* are wild symbol 105*a* on reel 34*a*, trigger symbol or diamond symbol 102 on reel 34*b* and wild symbol 105*b* on reel 34*c*. The gaming device now re-spins or re-activates reel 34*b* until an award symbol such as one of the letters is indicated on payline 56*b*. Any award symbol 100 indicated on that payline will provide a symbol combination having three identical symbols matching the award symbol 100 indicated on that payline. This occurs because two of the symbols on that payline are the wild symbols 105*a* and 105*b* as illustrated in FIG. 5C. Because only the middle reel 34*b* is re-activated or re-spun during the game to determine the award, the game is reduced to a one reel or single reel game. The player now only needs to obtain one award symbol to win an award in the award mode. More specifically, the player only has to spin one reel 34*b* to obtain the largest award such as the jackpot award in the game. Thus, because the award mode reduced the game to a one reel or single reel game, the probability of obtaining any of the awards, and specifically the largest award in the game, increases significantly.

In the award mode, when the middle reel 34*b* is re-activated and the trigger symbol or diamond symbol 102 is indicated on payline 56*b*, the gaming device re-spins or re-activates reel 34*b*. Thus in one embodiment, the trigger symbol or diamond symbol does not provide an award to the player in the game. In another embodiment, an award is associated with the trigger symbol and is provided to the player if the trigger symbol is indicated on the reel after the reel is re-activated in the award mode.

Similarly, if a non-award or null symbol (i.e., blank) 104 is indicated on payline 56*b* on reel 34*b*, the gaming device re-spins or re-activates reel 34*b*. Thus, a null symbol does not provide an award to the player; rather, the reels are re-spun to give the player another opportunity to obtain one of the awards in the game. Once an award symbol 100 is indicated on the designated payline on reel 34*b*, the gaming device provides an award associated with the award combination including those symbols. If the award symbol happens to be the jackpot symbol, the player obtains three of the jackpot symbols and therefore, the jackpot award in the game. The award received by the player in the game is transferred to the total award display 108 and provided to the player when the game ends. In one embodiment, the game ends when the player obtains an award in the game. In another embodiment, the game ends when the player runs out of spins as indicated by the spins remaining display 106.

In a further embodiment, the gaming device includes a modifier such as a multiplier which changes such as by increasing when the null symbol occurs on the reel. The modifier such as the multiplier is employed in one embodiment to increase the award determined by the generated symbol on the reel.

By effectively reducing the game to a single reel or one reel game, the present invention significantly increases the probability of obtaining an award in the game without changing the random probability of occurrence. In particular, the present invention increases the probability or the likelihood that the player will obtain the largest award such as the jackpot award in the game. For example, in a typical reel-type game, a player must obtain one of a plurality of designated symbol combinations on one or more of the paylines associated with a set of reels to obtain an award in the game. The gaming device or player spins the reels and the reels randomly indicate symbols on one or more of the paylines associated with the reels. If a winning symbol combination is indicated on one of the designated winning paylines in the game, the gaming device provides an award associated with that winning (symbol combination. The probability of obtaining a particular symbol combination, however, is based on the number of reels in a game and the number of symbols included on those reels. Thus, the more reels and symbols in a game, the less likely or less probable it is that the player will obtain one of the winning symbol combinations in that game.

For example, a particular game of the gaming device may include three reels, such as reels 34*a*, 34*b* and 34*c* in FIG. 3A. In this example, each of the reels includes twenty reel positions, which include nine award symbols as symbols A, B, C, D, E, F, G, and H, one wild symbol, one trigger symbol and ten null symbols. In this example, the symbols must occur or be indicated on payline 56*b* to provide a winning symbol combination in the game. Thus, at the beginning of the game each symbol has a 5% (1/20) chance or probability of being indicated on payline 56*b* on each of the reels as illustrated in FIG. 4A. As a result, the overall probability that a particular symbol combination will occur on that payline is (1/20)×(1/20)×(1/20), which equals (1/8000) or 0.013%. Therefore, in this example, because each symbol has a 5% (1/20) chance or probability of being indicated on a single payline on the reels, the overall probability of a particular symbol combination occurring on that payline in the primary game (without the award mode) is (1/8000) or 0.013%.

Referring to FIG. 3B, an example of a payout or award table is illustrated. In this example, a winning symbol combination in the primary game includes three identical symbols. For instance, the jackpot award or largest award indicated on the table is the award of ten thousand associated with the symbol combination including three A symbols (i.e., A, A, A). The award associated with the other winning symbol combinations are also shown in the table. It should be appreciated that any suitable combination of symbols in a game may be designated as a winning symbol combination.

Referring to FIG. 4A, a probability table for a primary game or base game indicates the probability of each of the symbols being indicated on a payline for each reel in the three reel slot game shown in FIG. 3A. The table also indicates the probability of being indicated on a payline associated with each of the winning symbol combinations shown in FIG. 3B for each of the symbols on the reels and the probability of three null symbols or blanks being indicated on the payline. As illustrated in the table, the probability of each of the award symbols (i.e., A, B, C, D, E, F, G and H) being indicated on any one of the reels is (1/20). The probability of a winning symbol combination including one of the award symbols, the trigger symbol or the wild symbol, being indicated on the designated payline is (1/8000) (i.e., (1/20)×(1/20)×(1/20)). The probability of three null symbols or blanks being indicated on the payline is ((10/20)×(10/20)×(10/20)) or (1/8). Therefore, a player has a one in eight thousand chance in the primary game to obtain one of the winning symbol combinations, and specifically of obtaining the jackpot award in the game.

In the award mode of the present invention, the number of reels is effectively reduced to one reel or one active reel such as reel 34*b*. As a result, the probability of obtaining a particular symbol or a particular symbol combination increases significantly. Referring to FIG. 4B, a probability table illustrates the probabilities of each of the symbols being indicated on the reel in the award mode. Additionally, the table illustrates the probability of a winning symbol combination, which in the award mode is one award symbol, being indicated on the payline in the award mode. Because the trigger symbol and the null symbols cause the reel to re-spin in the award mode, the number of effective award symbols in the award mode is reduced to nine. Therefore, the probability of each of the award symbols or the wild symbol being indicated on the payline in the game (through the award mode) is (1/180), which is the probability of the trigger symbol being indicated on the payline in the primary game (1/20) multiplied by the probability of any one of the award symbols or the wild symbol being indicated on the payline in the award mode, which is (1/9). The probability of one of the award symbols or the wild symbol being indicated in the game (through the award mode) is therefore, (1/20)×(1/9) or (1/180) as shown in FIG. 4B. Accordingly, the overall probability of obtaining a specific symbol combination is (0.013% (1/8000)+0.56% (1/180) which equal 0.573%.

Referring to FIG. 3A, in one example of the award mode of the present invention, if a trigger symbol or diamond symbol 102 is indicated on payline 56*b* in a primary game, an award mode is initiated and the outside reels 34*a* and 34*c* are re-activated or re-spun until wild symbols are indicated on payline 56*b*. Then, the reels 34*a* and 34*c* are held stationary while the middle reel 34*b* is re-activated or re-spun until an award symbol is indicated on payline 56*b*. The probability or likelihood of obtaining a particular symbol combination on the reels has now increased because the player only has to obtain one award symbol on reel 34*b* in order to obtain an award in the game.

Figure 1C:
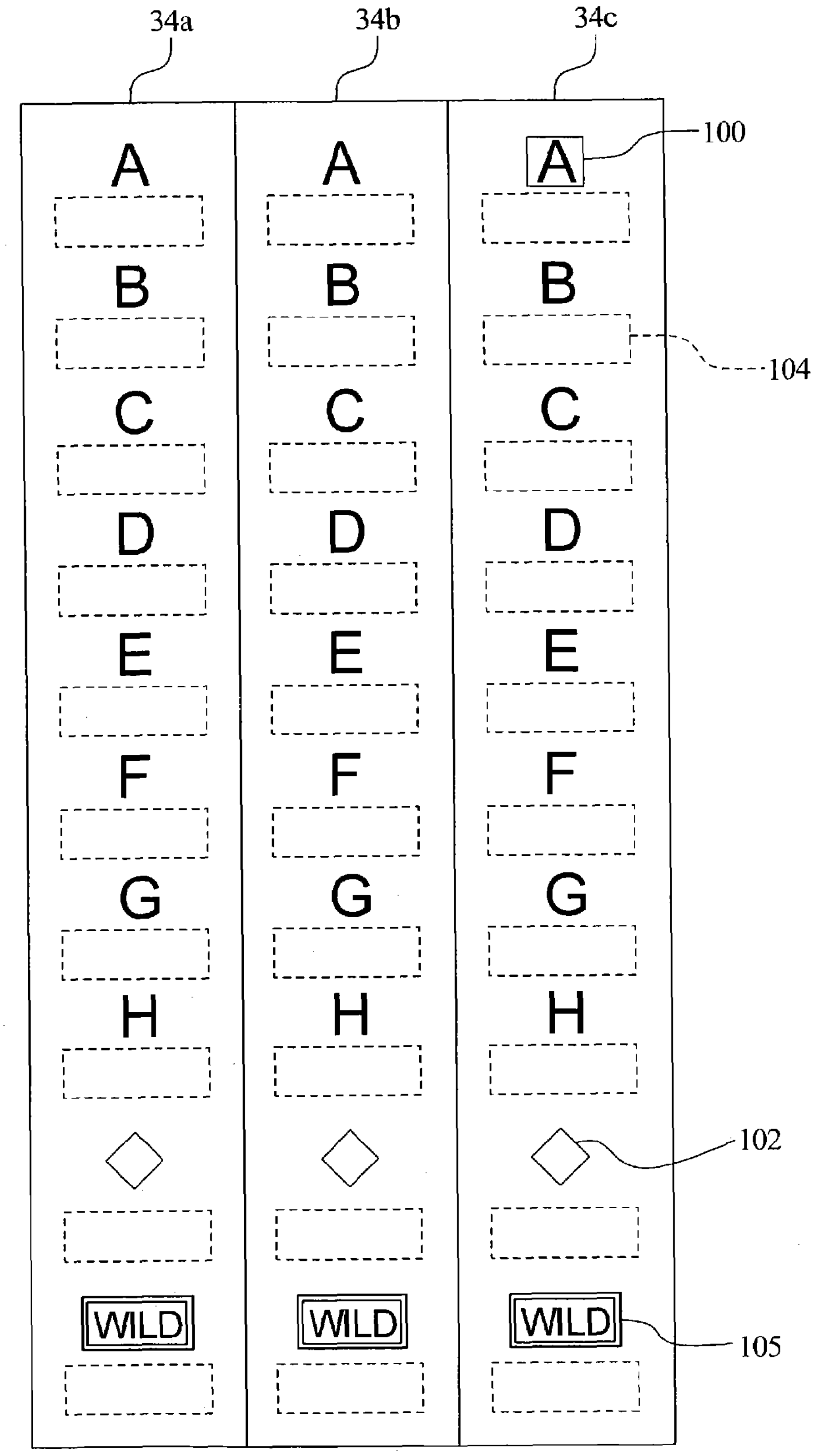
FIG. 1C is a enlarged elevation view of a set of reels and the reel stop positions included on the reels in a three reel slot game.

In this example, the middle reel 34*b* includes twenty reel positions including eight award symbols, one wild symbol, a trigger symbol or diamond symbol 102, and ten null symbols 104 as shown in FIGS. 1C and 3A. Therefore, the player initially has a one in twenty chance of obtaining the trigger symbol or diamond symbol 102 on reel 34*b* in the primary game as described above. In the award mode, if the player obtains the trigger symbol 102 or one of the null symbols 104 on payline 56*b* after the reel 34*b* is reactivated, the gaming device re-spins or re-activates reel 34*b* again until an award symbol 100 is indicated on payline 56*b*. Because the trigger symbol 102 and the null symbols 104 re-spin or re-activate the reels in the award mode, the actual number of symbols that provide an award and end the bonus mode are nine (i.e., the eight award symbols and the wild symbol). Therefore, the player has a one in nine chance of obtaining an award symbol 100 in the award mode and thereby a 11.1% chance of obtaining a winning symbol combination on payline 56*b*. As a result, the overall probability of obtaining a winning symbol combination on the reels in the award mode is determined by taking the probability of obtaining the trigger symbol or diamond symbol 102 on reel 34*b* in the initial or primary game, which is 1 in 20 (1/20), multiplied by the probability or the likelihood of one of the award symbols being indicated on payline 56*b*, which is 1 in 9 (1/9). The overall probability therefore equals (1/180) or 0.56% for obtaining any one of the winning symbol combinations on the reels in the game (through the award mode) as shown in FIG. 4B. Thus, the probability of obtaining a winning symbol combination on the reels in the primary game is 1 in 8000 or 0.013% and this probability increases to 1 in 180 or 0.56% in the award mode. This significantly increases a player's opportunities or chances of obtaining one of the awards in the game and specifically a relatively large award such as the jackpot award. This increases a player's excitement and enjoyment of the game.

Figure 5A:
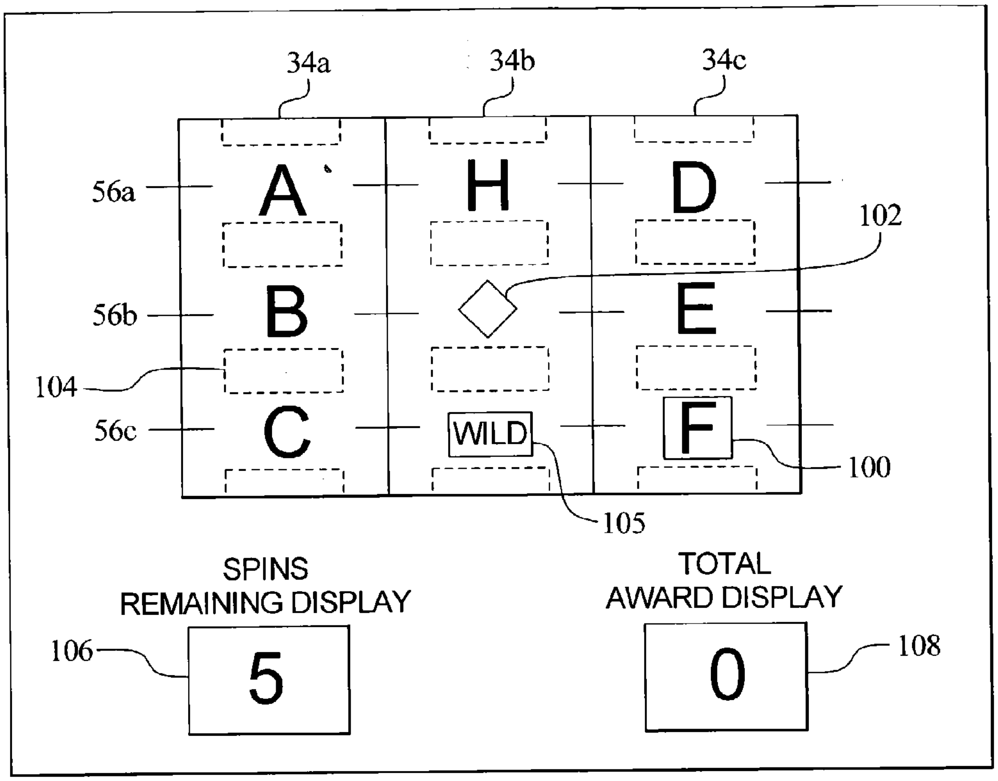
FIGS. 5A, 5B, 5C, 5D, 5E and 5F are enlarged front elevation views of an example of the embodiment shown in FIG. 3 illustrating a primary game and an award mode initiated by the occurrence of a triggering event in the primary game.
Figure 5B:
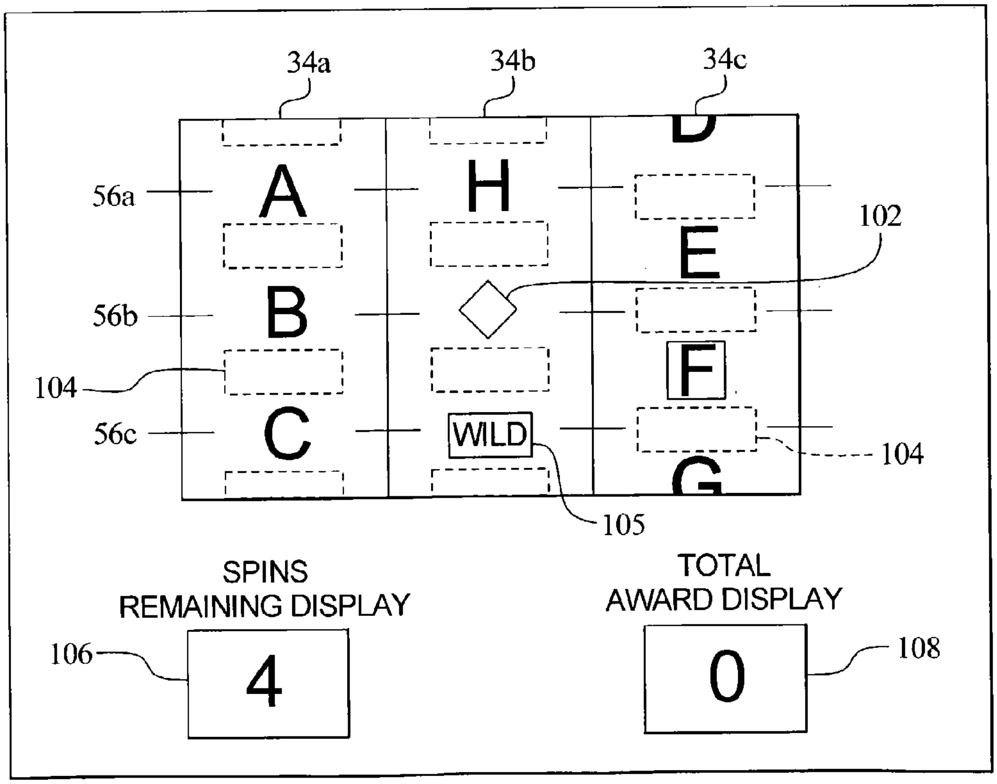
Figure 5C:
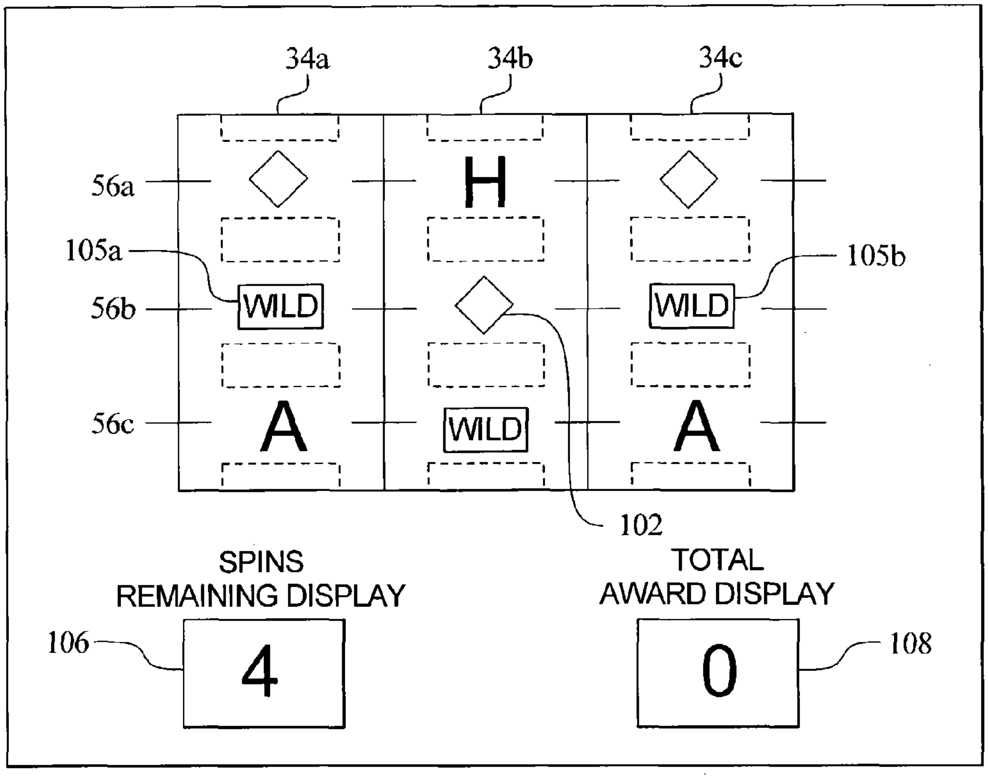

Referring to FIGS. 5A through 5F, an example of one embodiment of the present invention is illustrated where the player obtains a trigger symbol or diamond symbol 102 in the primary game or primary mode. This example includes three reels 34*a*, 34*b* and 34*c* as shown in FIG. 5A, where each reel includes a plurality of award symbols A, B, C, D, E, F, G and H, one trigger symbol designated as diamond symbol 102, one wild symbol 105 and ten null symbols 104. The player begins the game with five spins as indicated by the spins remaining display 106 as shown in FIG. 5A. Additionally, the player begins the game with an award of zero as indicated by the total award display 108. The player uses their first spin as shown in FIG. 5B to activate or spin the reels. A trigger symbol or diamond symbol 102 is indicated on payline 56*b* on reel 34*b*. The trigger symbol or diamond symbol 102 initiates the bonus mode of the present invention.

Referring to FIG. 5C, the gaming device freezes or holds reel 34*b* stationary while spinning or re-spinning the outside reels 34*a* and 34*c* until wild symbols 105*a* and 105*b*, respectively, are indicated on payline 56*b* on those reels. As indicated by the spins remaining display 106, the number of spins does not decrease when these reels are activated or re-activated to indicate the wild symbols. Additionally, the total award display 108 indicates that the player does not obtain an award for obtaining the trigger symbol (i.e., diamond symbol 102) or the wild symbols 105*a* or 105*b*. In another embodiment, the gaming device provides an award associated with the trigger symbol and/or the wild symbols.

Figure 5D:
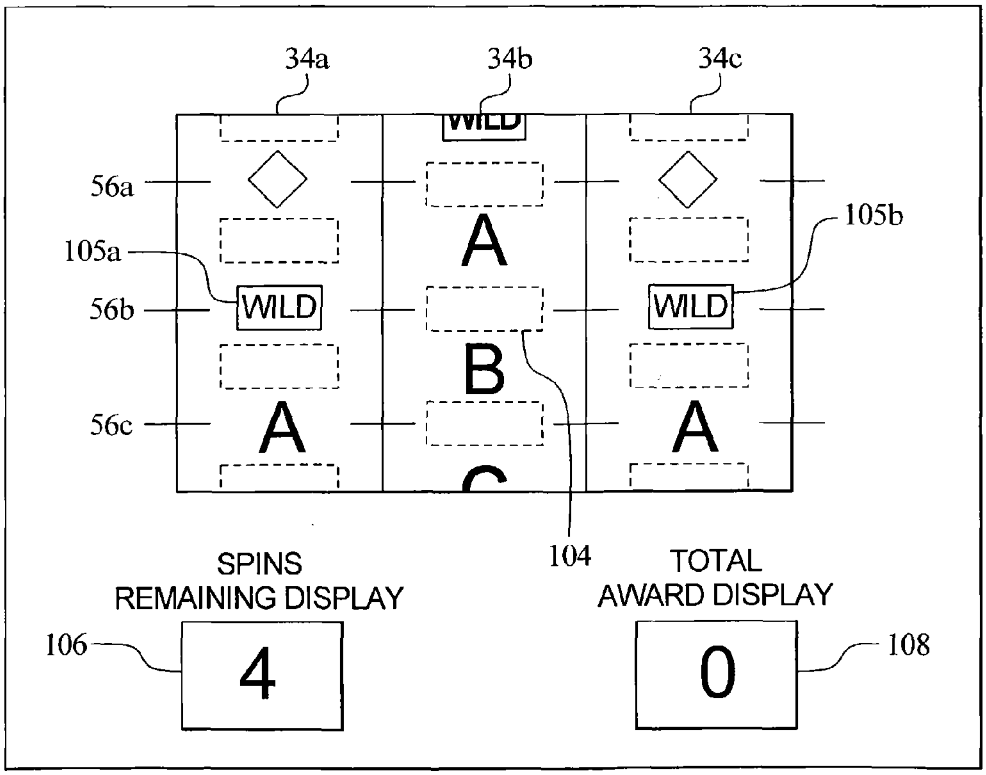

Referring to FIG. 5D, the outside reels 34*a* and 34*c* are stationary or cannot be re-activated, therefore the gaming device or player can only reactivate or re-spin reel 34*b*. In FIG. 5D the gaming device re-activates reel 34*b* and a null symbol 104 is indicated on payline 56*b*. The symbol combination of a wild symbol 105*a*, a null symbol 104 and wild symbol 105*b* on reels 34*a*, 34*b* and 34*c*, respectively, is not a winning symbol combination in the game. Therefore, the player does not receive an award for this symbol combination. However, the null symbol 104 does not end the game, but instead causes the gaming device to automatically re-spin or re-activate reel 34*b*. Thus, the null symbol 104 provides the player with another opportunity to obtain an award symbol in the game. The number of spins remaining in the award mode does not decrease as indicated by the spins remaining display 106 and the total award still remains at zero as indicated by the total award display 108.

Alternatively, as indicated above, the game upon the occurrence of the null symbol can change such as increment a modifier (such as a multiplier) which is employed to modify and preferably increase the award to the player.

Figure 5E:
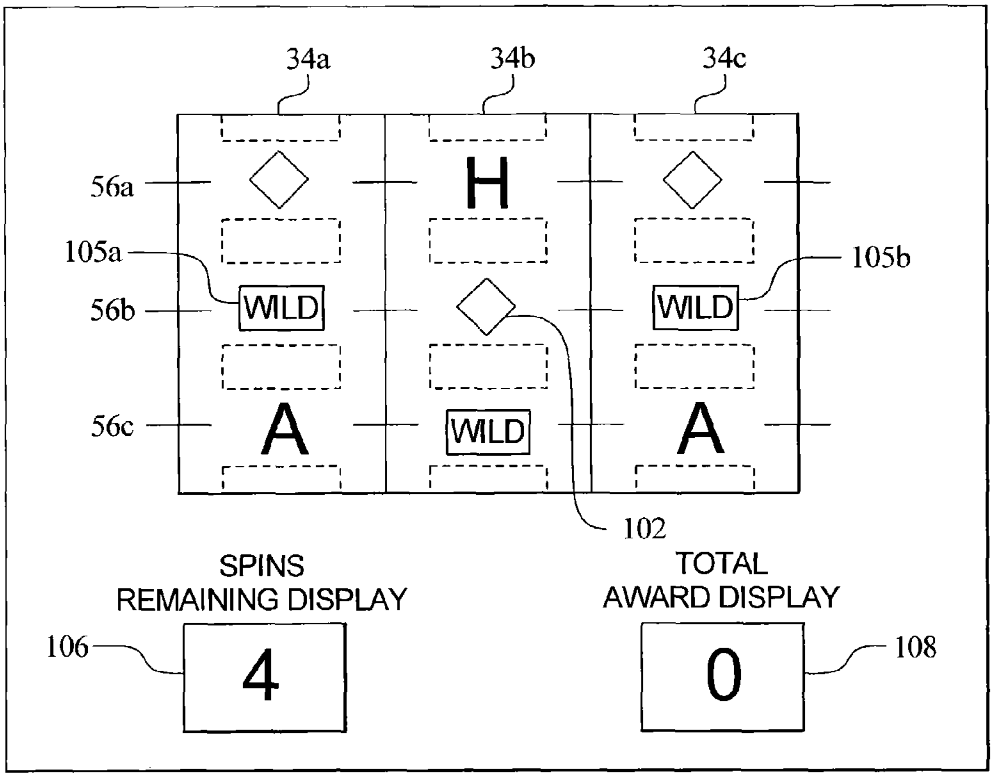

Referring to FIG. 5E, the gaming device or player re-activates reel 34*b* in the game. The trigger symbol or diamond symbol 102 is indicated on payline 56*b* on reel 34*b*. The resultant symbol combination is the wild symbol 105*a*, the trigger symbol 102 and the wild symbol 105*b*, on reels 34*a*, 34*b* and 34*c*, respectively, which is not a winning symbol combination. Similar to the null symbol 104 shown in FIG. 5D, the trigger symbol or diamond symbol 102 causes the gaming device to re-activate or re-spin reel 34*b*. Therefore, the player has another opportunity to obtain an award symbol in the game. The number of spins remaining in the bonus mode and the total award did not change in the game as indicated by the spins remaining display 106 and the total award display 108.

Figure 5F:
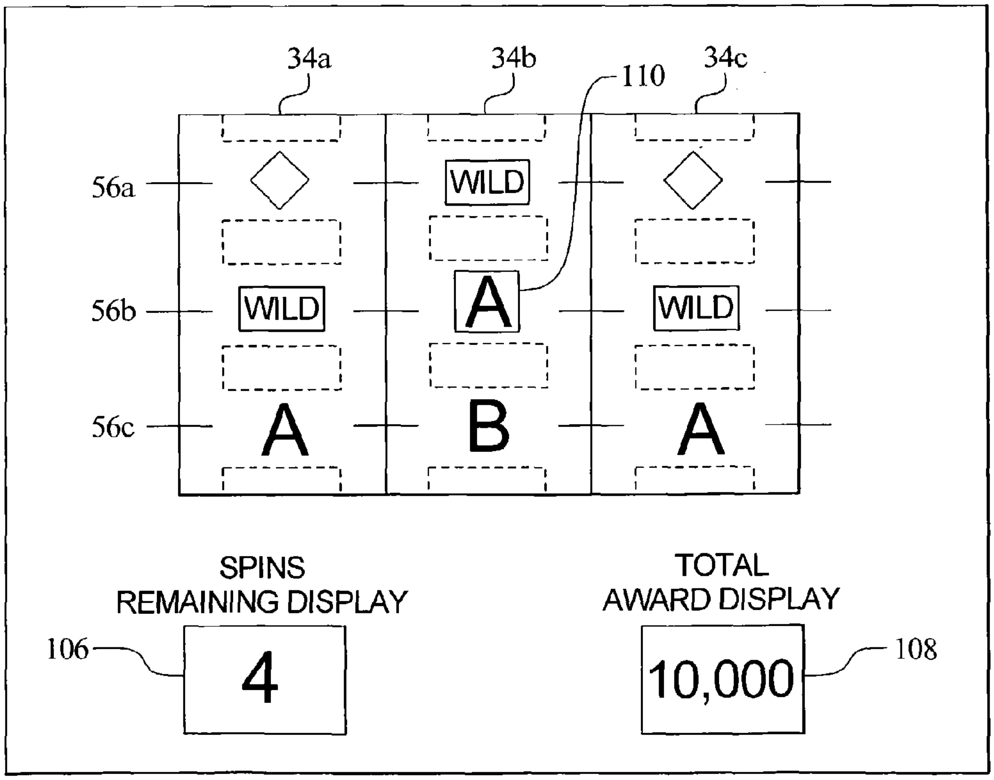

Referring to FIG. 5F, the gaming device or player re-spins and reactivates reel 34*b* in the award mode. After this spin, an award symbol designated by the letter A (110) is indicated on payline 56*b* on reel 34*b*. As a result, a winning symbol combination including wild symbol 105*a* on reel 34*a*, award symbol 110 on reel 34*b* and wild symbol 105*b* on reel 34*c* is indicated on payline 56*b*. This symbol combination provides a combination of three A symbols 110 because the wild symbols act or equal the award symbol 110. In this example, a combination including three A symbols provides the jackpot or largest award of ten thousand to the player as indicated by the total award display 108. Thus, the trigger symbol or diamond symbol 102 increases the probability or likelihood that the player will obtain an award and particularly the jackpot award in the game. The player has four spins remaining as indicated by the spins remaining display 106. In one embodiment, the player uses the remaining spins to spin the reels four more times in the award mode. In another embodiment, the game ends when the player obtains an award in the game.

Figure 6:
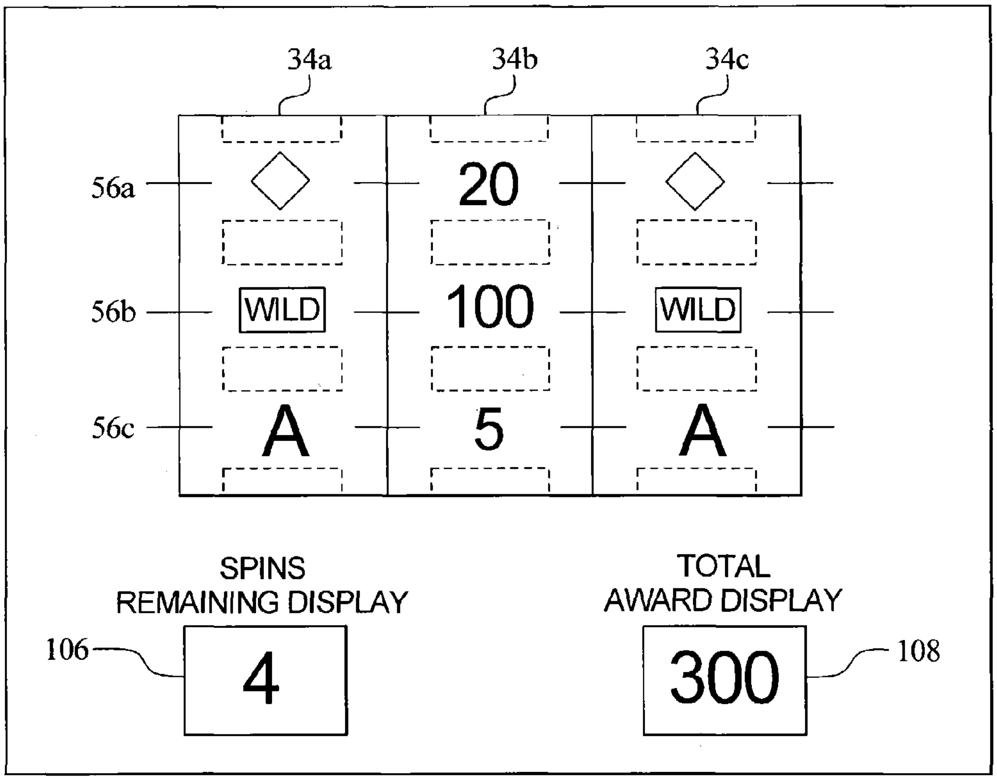
FIG. 6 is an enlarged elevation view of one of the display devices of FIGS. 1A and 1B illustrating another embodiment of the present invention.

Referring to FIG. 6, another embodiment of the present invention is illustrated where the symbols on the middle or central reel 34*b* include awards, such as the values of twenty, one hundred and five. In the award mode of this embodiment, the player re-spins or re-activates reel 34*b* until one of the award values are indicated on payline 56*b*. Instead of obtaining a winning symbol combination in the game, the player obtains three times the value of the indicated award or value on payline 56*b*. For example, in FIG. 6, the award of one hundred is indicated on payline 56*b* in the award mode. Therefore, the combination of the award of one hundred with the wild symbols 205*a* and 205*b* provide an award of three hundred because the wild symbols match the award value indicated on payline 56*b* on reel 34*b*. Thus, the player obtains an award of three hundred as indicated by the total award display 108 in the award mode. It should be appreciated that any symbols, values or any combination of symbols or values may be employed on the reels in the award mode of the game of the present invention.

Figure 7:
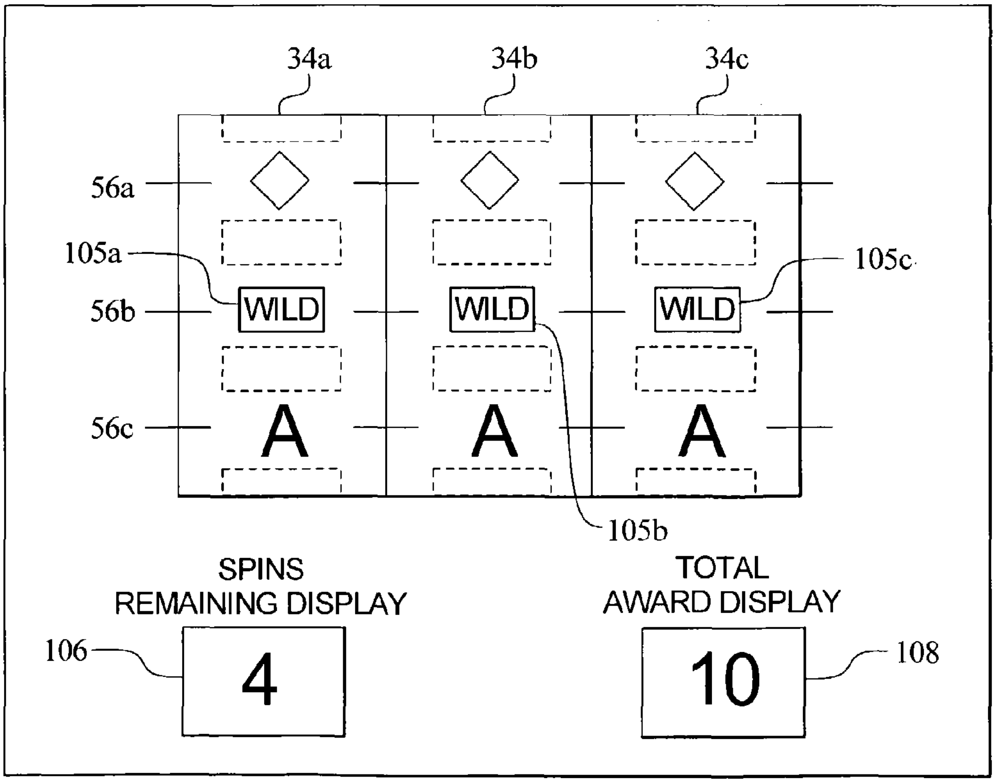
FIG. 7 is an enlarged elevation view of one of the display devices of FIGS. 1A and 1B illustrating a further embodiment of the present invention.
Figure 8:
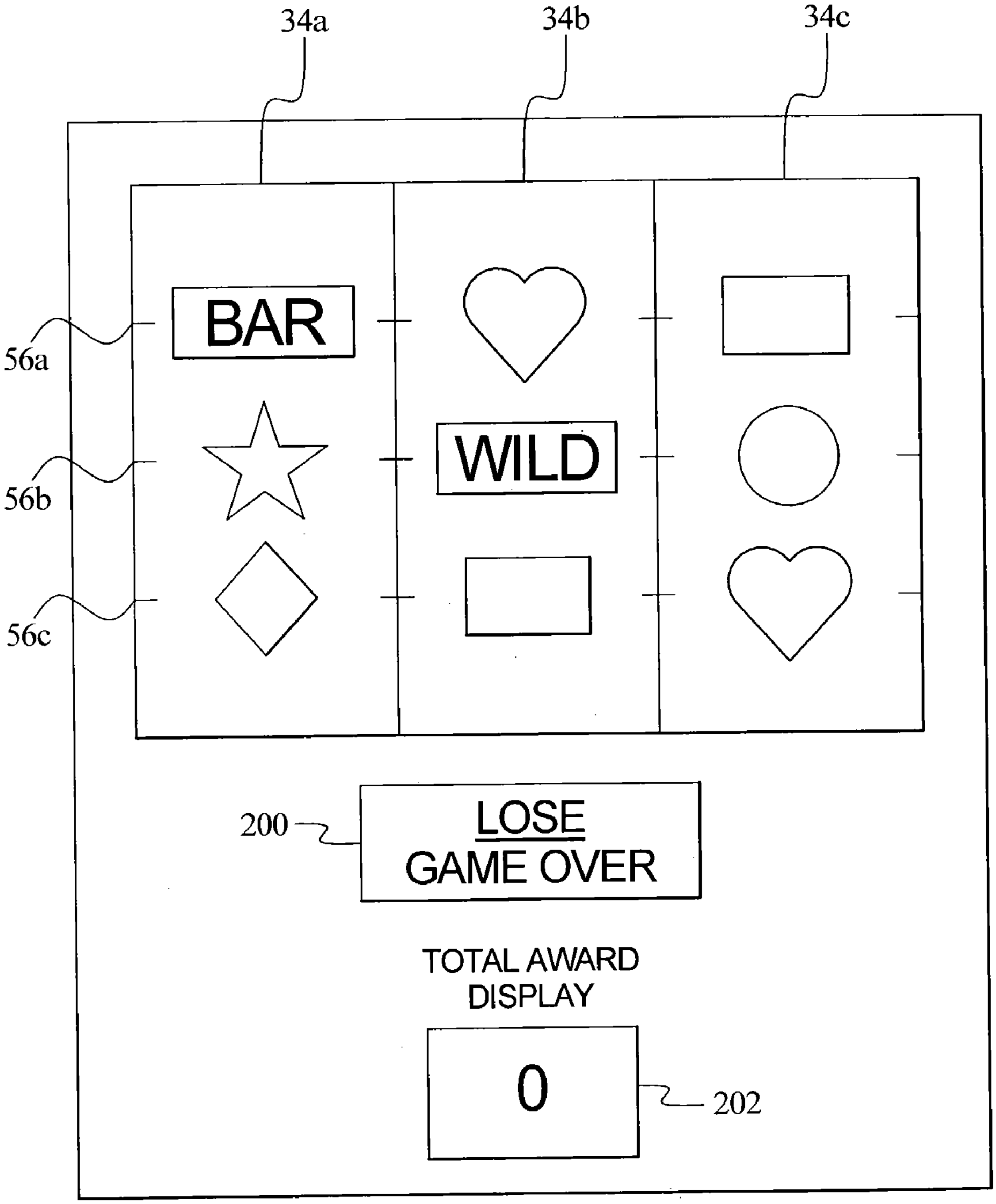
FIG. 8 (PRIOR ART)
FIG. 8 is an enlarged elevation view of a known game in a gaming device.

Referring to FIG. 7, a further embodiment of the present invention is illustrated where the middle or center reel 34*b* includes a wild symbol 105*b*. In this embodiment, the player re-spins reel 34*b* after obtaining the trigger symbol or diamond symbol 102 as described above. If the player obtains the wild symbol on payline 56*b* on reel 34*b*, the player obtains a symbol combination including three wild symbols 105*a*, 105*b* and 105*c*. Thus, the player obtains the largest award or the highest or most desirable symbol combination associated with the game such as the jackpot symbol combination because the player obtained three wild symbols on payline 56*b*. Thus, the wild symbol 105*b* increases the probability that the player will obtain the largest award such as the jackpot award in the game. In another embodiment, an award or award value is associated with the symbol combination including the wild symbol as shown in FIG. 3B.

In one alternative embodiment of the present invention, the number of spins of the reel can be limited such as to a predetermined number, a randomly determined number, or a number based on another functional game element such as the player's wager.

Wild Symbol Related Award

In an alternative embodiment, the gaming device includes a game which displays a plurality of reels to a player. The reels include a plurality of symbols having at least one trigger symbol such as a wild symbol. The trigger symbol enables a player to obtain additional opportunities to obtain awards in a game after one or more losing symbol combinations including at least one wild symbol are indicated on the reels.

In one alternative embodiment, the gaming device activates or spins the reels for at least one activation or spin in a game and indicates one or more symbols such as a combination of symbols on the reels. If the symbol combination indicated on the reels includes a wild symbol, but is not a winning symbol combination in the game, the gaming device holds the reel including the wild symbol stationary. The gaming device then provides the player with a designated number of activations or spins to re-spin at least one of the reels other than the held reel in the game. The designated number of activations or spins may be predetermined, randomly determined, determined based on a wager made by a player or determined according to any suitable determination method in a game. In another embodiment, the wild symbol and the symbol combinations are indicated on one payline associated with the reels, a plurality of paylines associated with the reels or on all of the paylines associated with the reels.

Figure 9:
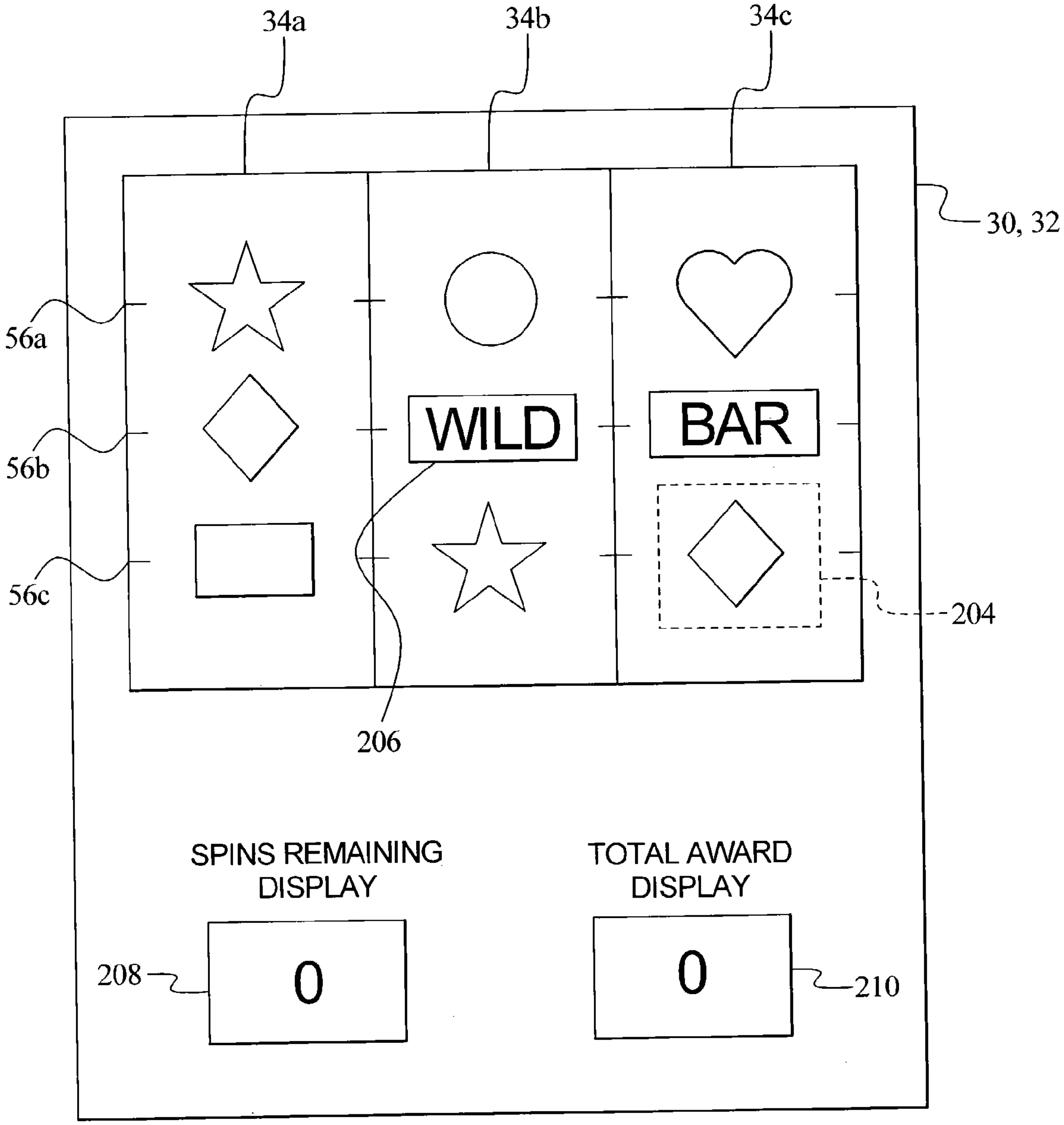
FIG. 9 is an enlarged elevation view of an alternative embodiment of the present invention.

Referring to FIG. 9, in an example of the above embodiment, the gaming device displays a plurality of reels to a player. The reels include a plurality of symbols 204 including at least one trigger symbol, which is a wild symbol 206. The symbols in this example are shapes such as circles, rectangles, hearts, diamonds, stars and bar symbols. It should be appreciated that the symbols may be shapes, numbers, letters, characters or any suitable images. Three paylines 56*a*, 56*b* and 56*c* are associated with the reels. In this example, the gaming device provides an award to the player for any winning symbol combinations including three matching symbols indicated on payline 56*b*. A spins remaining display 208 indicates the number of free spins provided to the player in a game, if any. A total award display 210 indicates the total award accumulated by the player in the game. At the start of the game, the number of free spins is zero and the total award is zero.

Figure 10A:
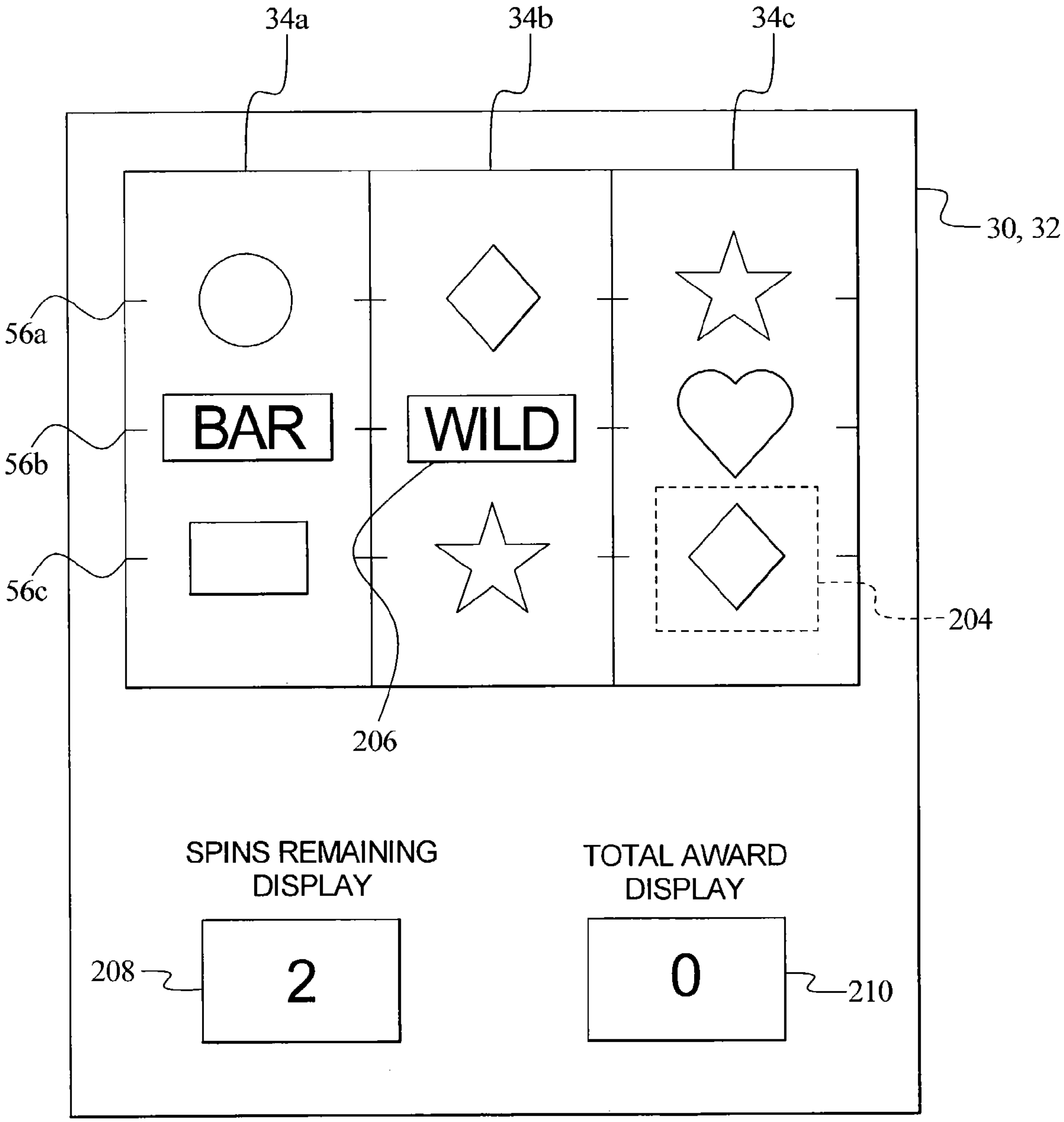
FIG. 10A is an enlarged elevation view of an example of the alternative embodiment of the present invention where a wild symbol is indicated on one of the reels.

Referring to FIG. 10A, the gaming device activates or spins the reels in the game and a symbol on each reel is indicated on the payline 56*b*. Specifically, a wild symbol 206 is indicated on the payline. However, a winning symbol combination is not indicated on the payline because three matching symbols are not indicated on the payline. Thus, the player obtained a wild symbol but did not obtain a winning symbol combination in the game. The gaming device therefore holds reel 34*b*, which includes the wild symbol 206, stationary, and provides two free spins of the reels as indicated by the spins remaining display 208. As a result, the gaming device provides the player with additional opportunities to win awards associated with the wild symbol. This increases the player's excitement and enjoyment in the game. The total award in the game is still zero as indicated by the total award display 210.

Figure 10B:
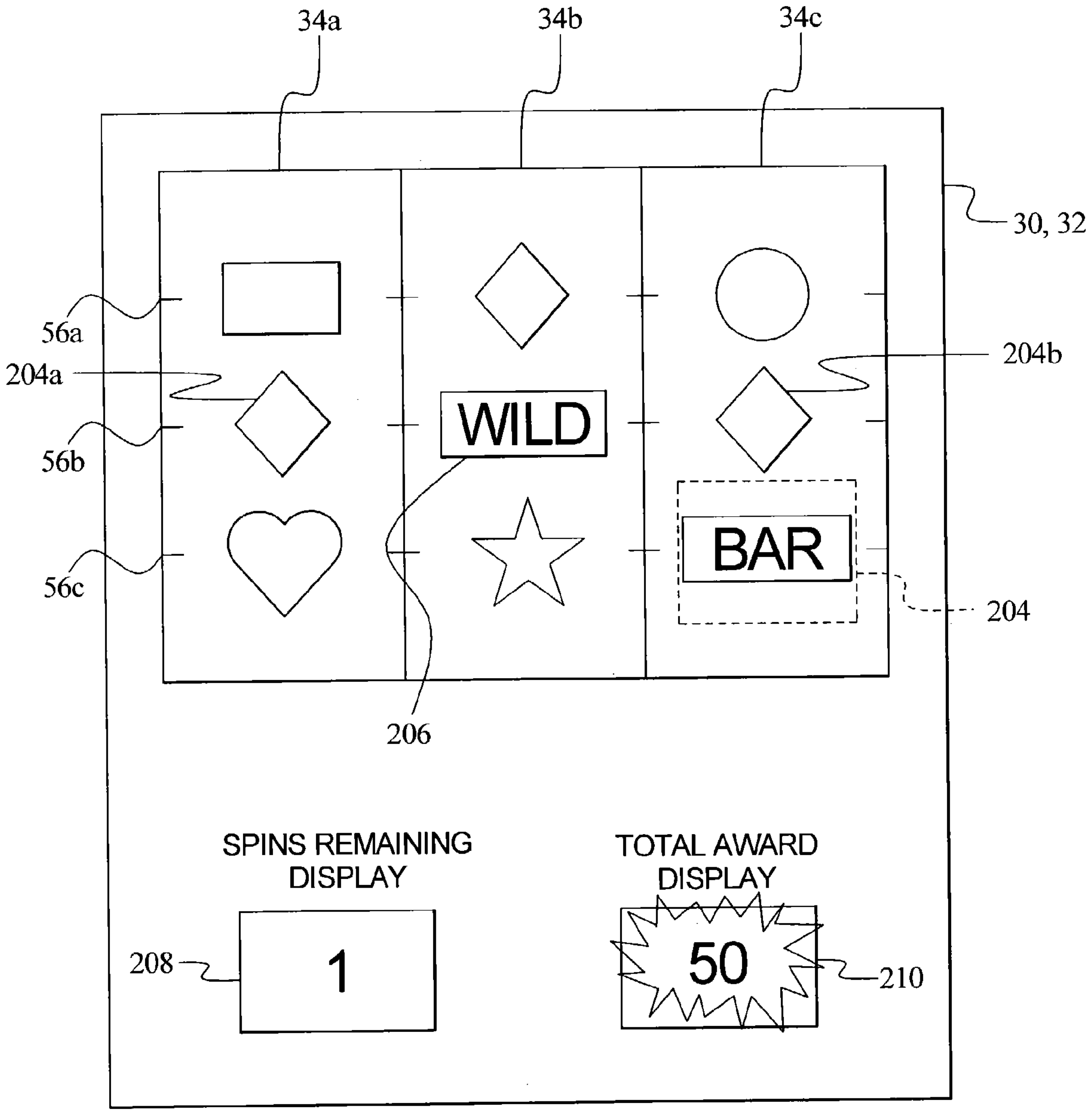
FIG. 10B is an enlarged elevation view of the example of FIG. 10A where a winning symbol combination is indicated on the reels.

Referring to FIG. 10B, the gaming device activates or spins the reels using one of the free spins provided to the player in the game. The reels stop spinning and three symbols are indicated on payline 56*b*. The indicated symbols are a diamond symbol 204*a*, the wild symbol 206 and another diamond symbol 204*b*. The wild symbol 206 matches or substitutes for one of the symbols indicated on the payline. Because only diamond symbols are indicated on the payline, the wild symbol matches or substitutes as a diamond symbol on the payline. Thus, a symbol combination including three matching symbols, specifically three diamond symbols, is indicated on payline 56*b*. This is a winning symbol combination in the game. Therefore, the gaming device provides an award associated with the winning symbol combination (i.e., three diamond symbols), which in this example is an award of fifty. The award of fifty is added to the player's total award and the player now has a total award of fifty as indicated by the total award display 210. The game ends and the total award indicated by the total award display is provided to the player.

In another alternative embodiment, the gaming device holds a reel including a wild symbol stationary when the wild symbol occurs on or is indicated on a designated payline in the game and the award amount associated with any winning symbol combinations indicated on the payline are not greater than a designated award amount in the game. The gaming device therefore ensures that if the player does obtain an award in the game, the award is above a designated award or award amount (i.e., a minimum award amount). It should be appreciated that the designated award amount may be any suitable award amount such as a particular symbol combination or combinations, or a particular award value in the game.

Referring to FIG. 11, an example of this embodiment is illustrated where the gaming device displays a plurality of reels including symbols 204. The symbols include at least one wild symbol 206 as described above. In this example, the gaming device designates a particular award amount to be a minimum award amount in the game. Therefore, the gaming device will provide an award to the player only if the award or award amount associated with a winning symbol combination indicated by the reels is equal to or greater than the designated award amount for the game. In FIG. 11, an award summary table 212 displays a plurality winning symbol combinations 214 such as the winning symbol combination including three bar symbols (214*a*), associated with the symbols in the game. Additionally, a plurality of awards 216 such as the award of two hundred fifty (216*a*) are associated with the winning symbol combinations. In this example, the gaming device designated winning symbol combination 214*b* and the associated award of twenty-five (216*b*) as the minimum award amount in the game. Thus, the player must obtain a winning symbol combination 214 that produces an award greater than twenty-five, which is the designated award amount in the game.

Figure 11A:
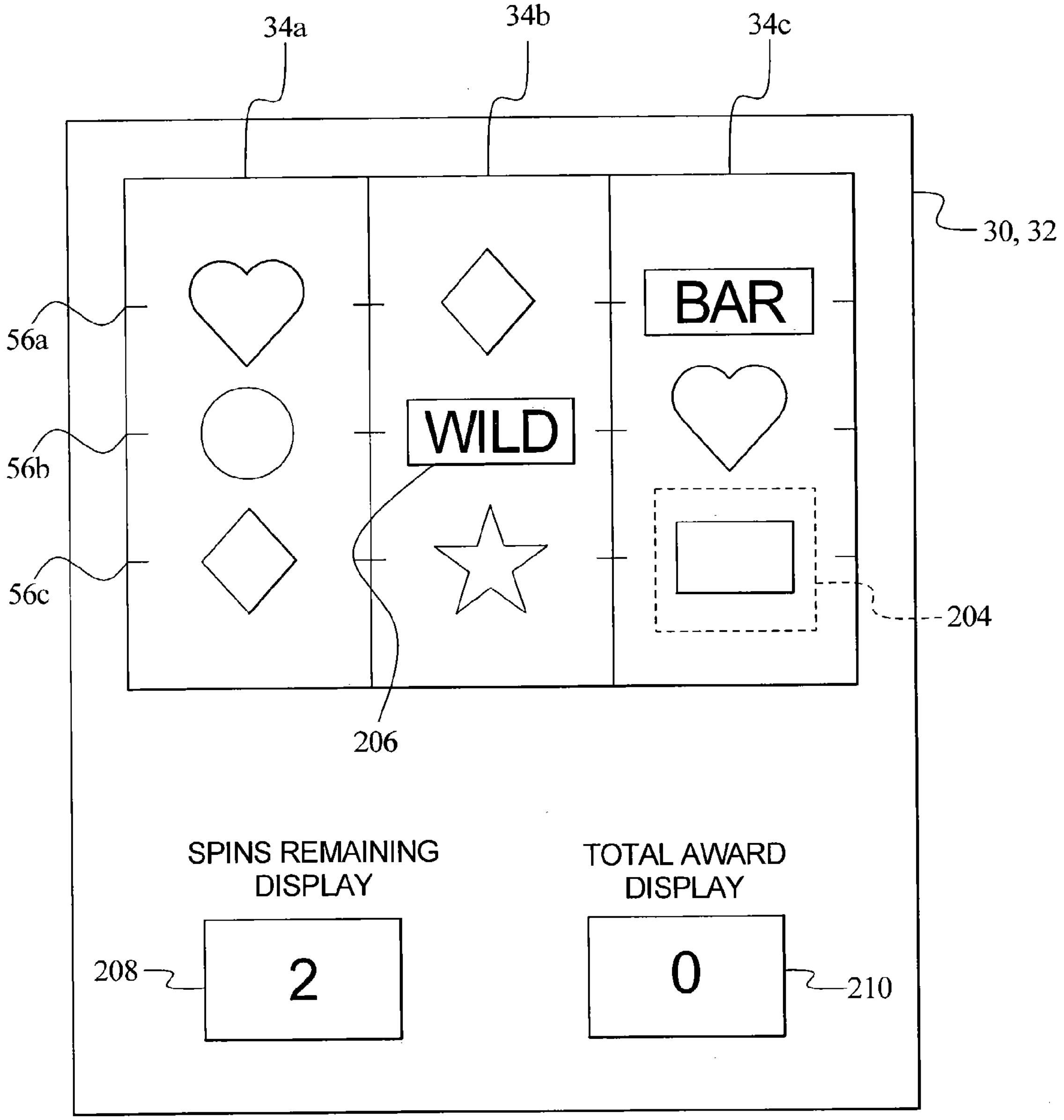
FIG. 11A is an enlarged elevation view of an example of another alternative embodiment of the present invention.
Figure 11B:
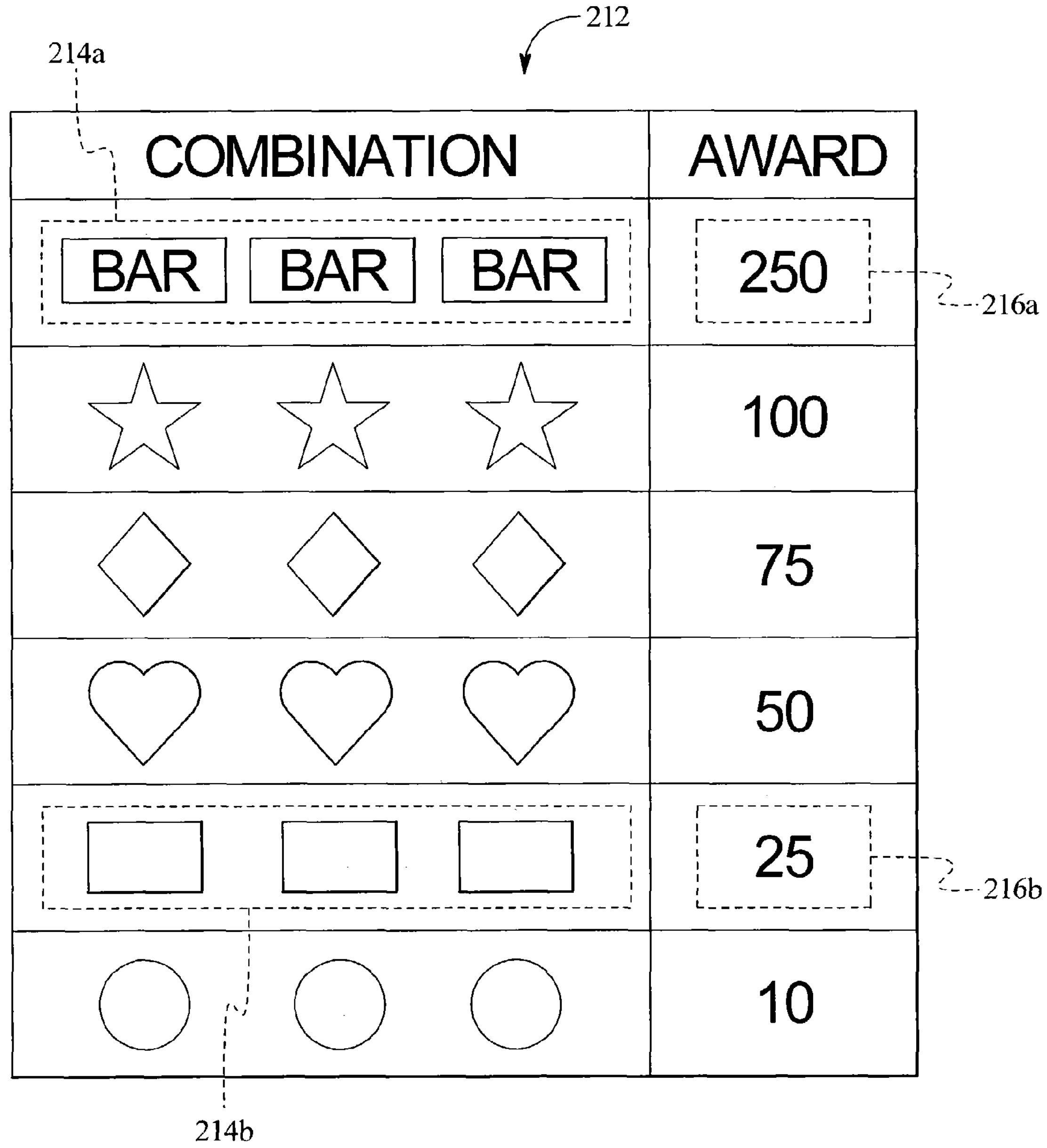
FIG. 11B is an award summary;table associated with the embodiment of FIG. 11A.

Referring to FIGS. 11A and 11B, the gaming device spins the reels and three symbols are indicated on payline 56*b*. The symbols include a circle symbol, a wild symbol 206 and a heart symbol. Because this symbol combination is not a winning symbol combination as indicated by the award summary table 212, the gaming device holds the reel including the wild symbol 206 stationary and provides a designated number of free spins to the player to obtain an award related to or based on the wild symbol 206. The gaming device provides two free spins to the player as indicated by the spins remaining display 208. The gaming device will use the free spins to spin reels 34*a* and 34*c* in the game. Because the player did not obtain an award in this spin, the total award is still zero as indicated by the total award display 210.

Figure 11C:
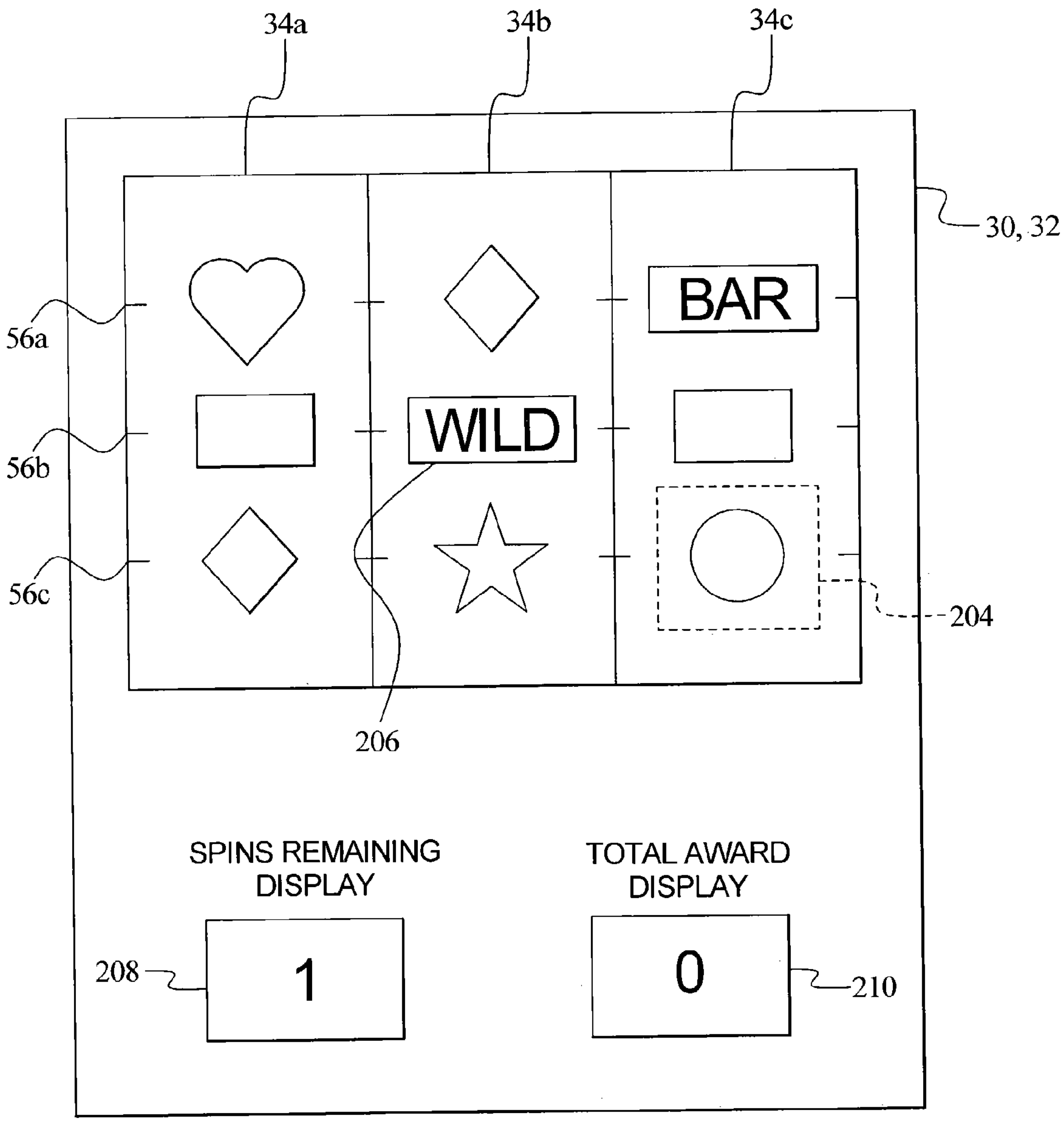
FIGS. 11C and 11D are enlarged elevation views of the example of the embodiment of FIG. 11A.

Referring to FIG. 11C, the gaming device activates or spins the reels 34 using the first free spin. The reels stop spinning and three symbols are indicated on payline 56*b*. The symbols are a rectangle symbol, the wild symbol 206 and another rectangle symbol. The wild symbol 206 substitutes for one of the rectangle symbols on payline 56*b* and therefore, a symbol combination including three matching rectangle symbols are indicated on payline 56*b*. This symbol combination, however, does not generate an award or award amount greater than the designated award amount of twenty-five. Thus, the player does not obtain a winning symbol combination in this spin. There is only one free spin remaining in the game as indicated by the spins remaining display 208. Also, the total award is still zero as indicated by the total award display 210.

Figure 11D:
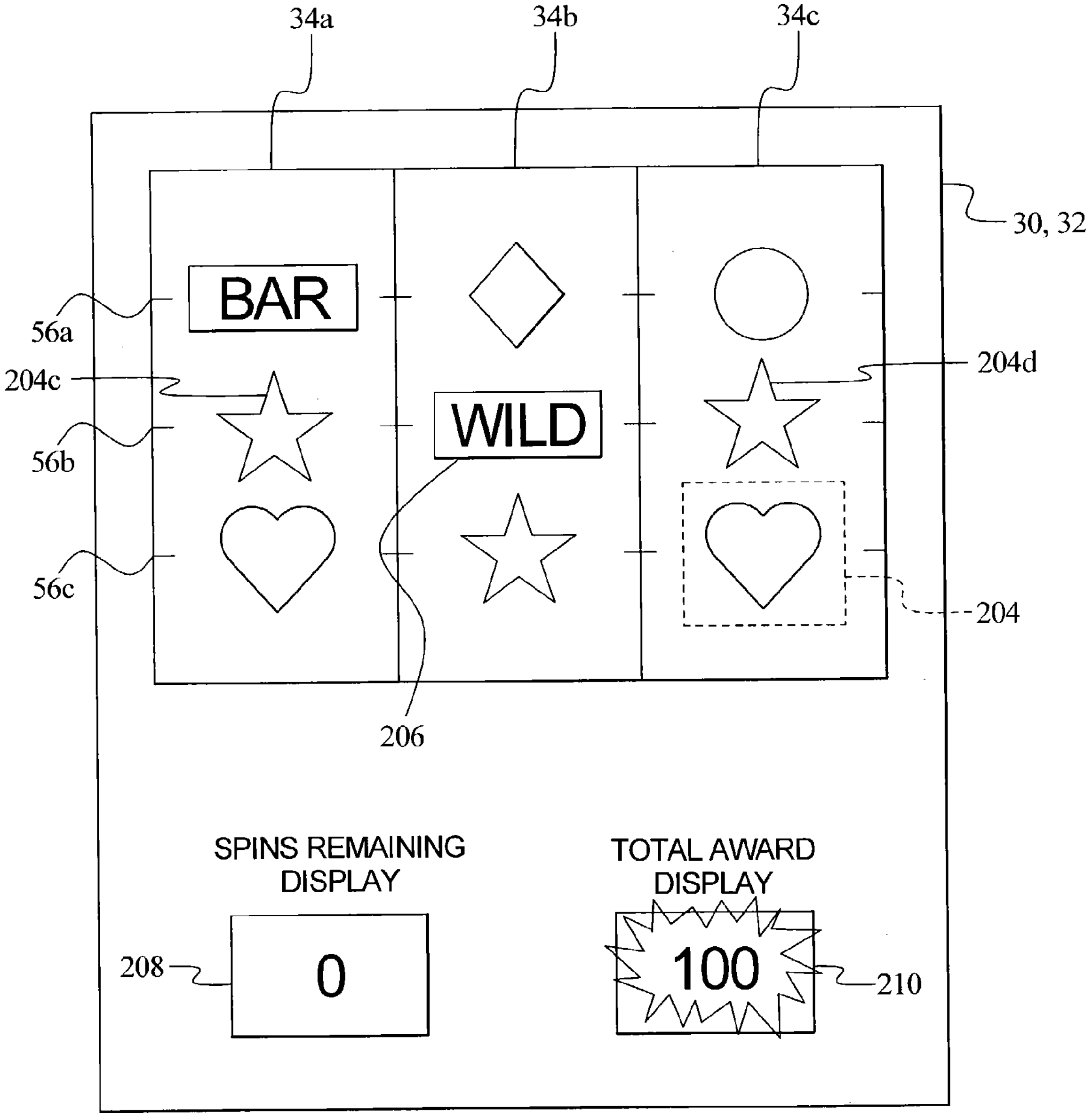

Referring to FIG. 11D, the gaming device activates or spins the reels 34 using the last free spin in the game. After this spin, the reels indicate a star symbol 204*c*, the wild symbol 206 and star symbol 204*d*. The wild symbol 206 substitutes as one of the symbols on the payline (i.e., a star symbol) and therefore a winning symbol combination including three star symbols is indicated on payline 56*b*. Also, this winning symbol combination provides an award which is greater than the designated award amount 216*b* associated with the winning symbol combination 214*b* as shown in FIG. 11B because the award of one hundred associated with three star symbols is greater than the award of twenty-five associated with the three rectangle symbols. Thus, the gaming device adds the award of one hundred to the player's total award in the game as indicated by the total award display 210.

In one embodiment as illustrated in this example, the game ends when the player obtains an award in the game regardless of whether the player obtains the award in the first spin or the last spin in the game. In another embodiment, the gaming device activates or spins the reel or reels other than the reel including the wild symbol until a winning symbol combination is indicated on the reels or until there are no spins remaining in the game. In another embodiment, the gaming device activates or spins the reel or reels other than the reel including the wild symbol until a winning symbol combination is indicated on the reels. In a further embodiment, the gaming device activates or spins the reel or reels other than the reel including the wild symbol until there are no spins remaining in the game. In this embodiment, the gaming device provides awards to the player associated with any winning symbol combinations that occur on the reels during the designated number of activations or spins of the reels.

In a further alternative embodiment of the present invention, if a player achieves a bonus triggering or qualifying condition during the primary game, the gaming device 10 initiates a free spins game. In the free spins game, the gaming device provides one or more activations or free spins of the reels to the player. The gaming device or player continues to spin or activate the reels until there are no free spins remaining in the game. In another embodiment, if a re-triggering event occurs in a game, the gaming device re-triggers or re-spins the reels in the game (i.e., provides additional free spins in the game). The re-triggering event may be a re-trigger symbol occurring on the reels, a re-trigger symbol combination occurring on the reels or any suitable event. It should be appreciated that the gaming device may re-trigger or re-spin the reels one or more times in the game.

Figure 12:
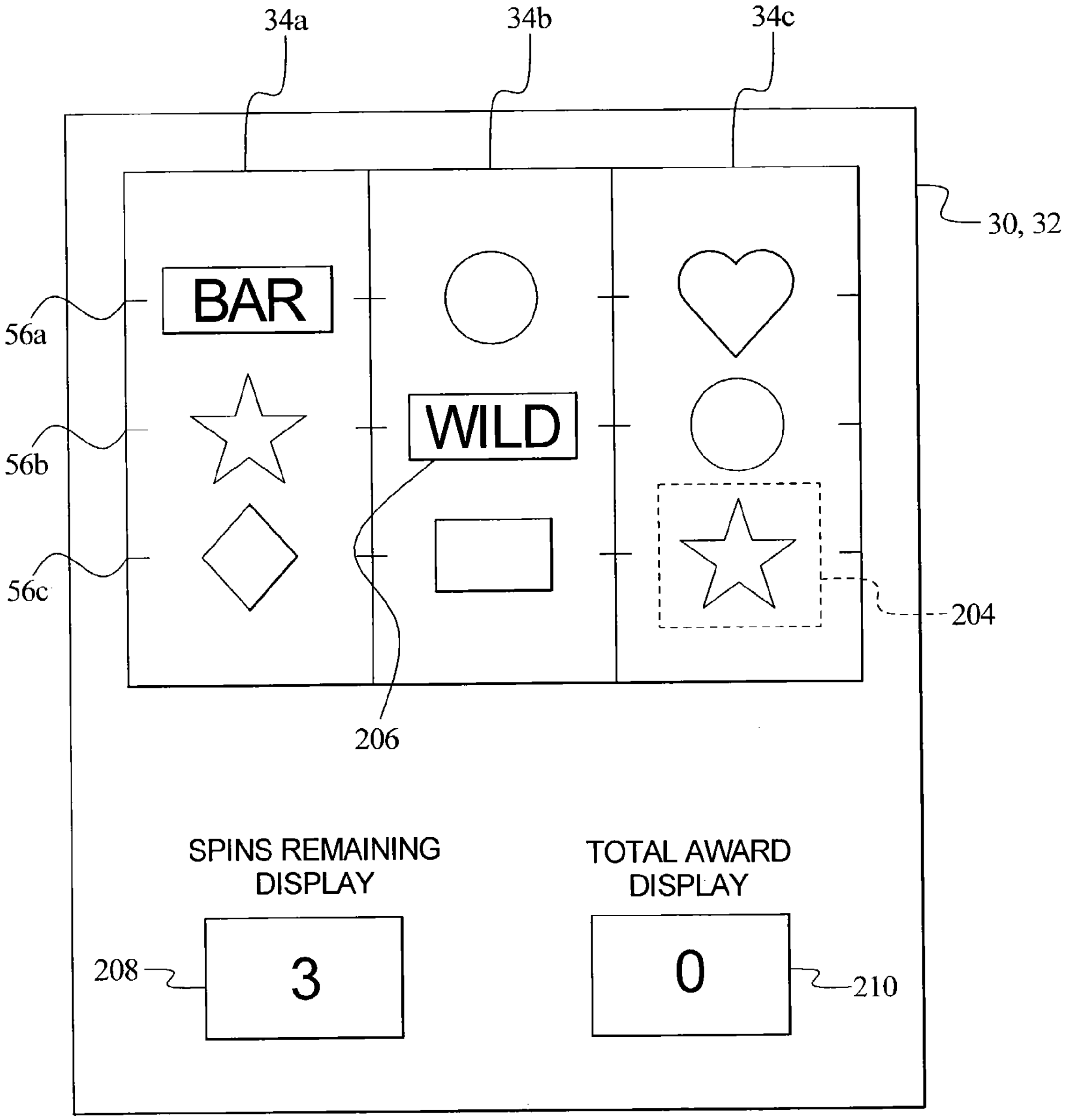
FIG. 12 is an enlarged elevation view of a further alternative embodiment of the present invention.

Referring to FIG. 12, one embodiment of the present invention is illustrated. In this embodiment, the gaming device includes a plurality of reels displayed to a player and the gaming device provides the player with a designated number of activations or free spins of the reels. The reels may be mechanical reels or video reels as described above. The reels include a plurality of symbols where the symbols include at least one wild symbol. A plurality of awards are associated with the symbols 204 or combinations of the symbols 204 and the awards may be values, credits, free spins, free games, multipliers or any suitable award or awards. The wild symbol or wild symbols 206 are designated with the word "WILD" but may be designated with any suitable designator or symbol. In a game, the wild symbol 206 matches or substitutes for any one of the symbols 204 on the reels in the game. In one embodiment, the wild symbol substitutes for one of the symbols indicated on the same payline as the wild symbol. In another embodiment, the wild symbol matches or substitutes for the most desirable symbol on a payline or on the reels such as the jackpot symbol or the symbol associated with the largest award in the game. A spins remaining display 208 indicates the number of spins remaining in a game. A total award display 210 indicates the total award accumulated by a player in the game.

In a game, the gaming device or the player activates or spins the reels to indicate symbols on the reels. Symbols may be indicated on one or more reels such as in a scatter pay combination, or on a single payline associated with the reels. The gaming device provides any awards associated with any winning symbol combination indicated on the reels. The gaming device or player continues to activate or spin the reels for a designated number of spins in a game until there are no activations or spins remaining in the game. The player then receives the total award indicated in the total award display 210.

In one embodiment of the present invention, the gaming device enhances a player's opportunity to obtain one or more awards in a game by utilizing the indicated wild symbol 206 to provide a better opportunity of obtaining an award in a game. In this embodiment, the gaming device or player spins the reels 34*a*, 34*b* and 34*c* to indicate symbols on the reels. If a wild symbol is indicated on one of a plurality of paylines associated with the reels 34, the reel including the wild symbol 206 is frozen or held stationary. The gaming device then activates the reels, not including the reel having the wild symbol, to enhance the opportunity of obtaining an award in the game. Because the wild symbol 206 is held stationary or in place on one of the paylines associated with the reels, less symbols must be indicated on the reels to obtain a winning symbol combination in the game. For example, in FIG. 12, the wild symbol is indicated on payline 56*b*. The gaming device or players spins the other reels 34*a* and 34*c* to attempt to obtain a winning symbol combination including the wild symbol 206. However, the number of reels that are activated in the game decrease, which thereby increases the chance or opportunity that the player will obtain a winning symbol combination including the wild symbol, in the game. The player or gaming device continues to spin the reels 34*a* and 34*c* for the remaining number of activations in the game until there are no activations or spins remaining in the game. The gaming device provides the player with any awards associated with winning symbol combinations indicated on the reels. The awards are added to the total award display 210 and the player receives the total award indicated by the total award display at the end of the game.

Figure 13A:
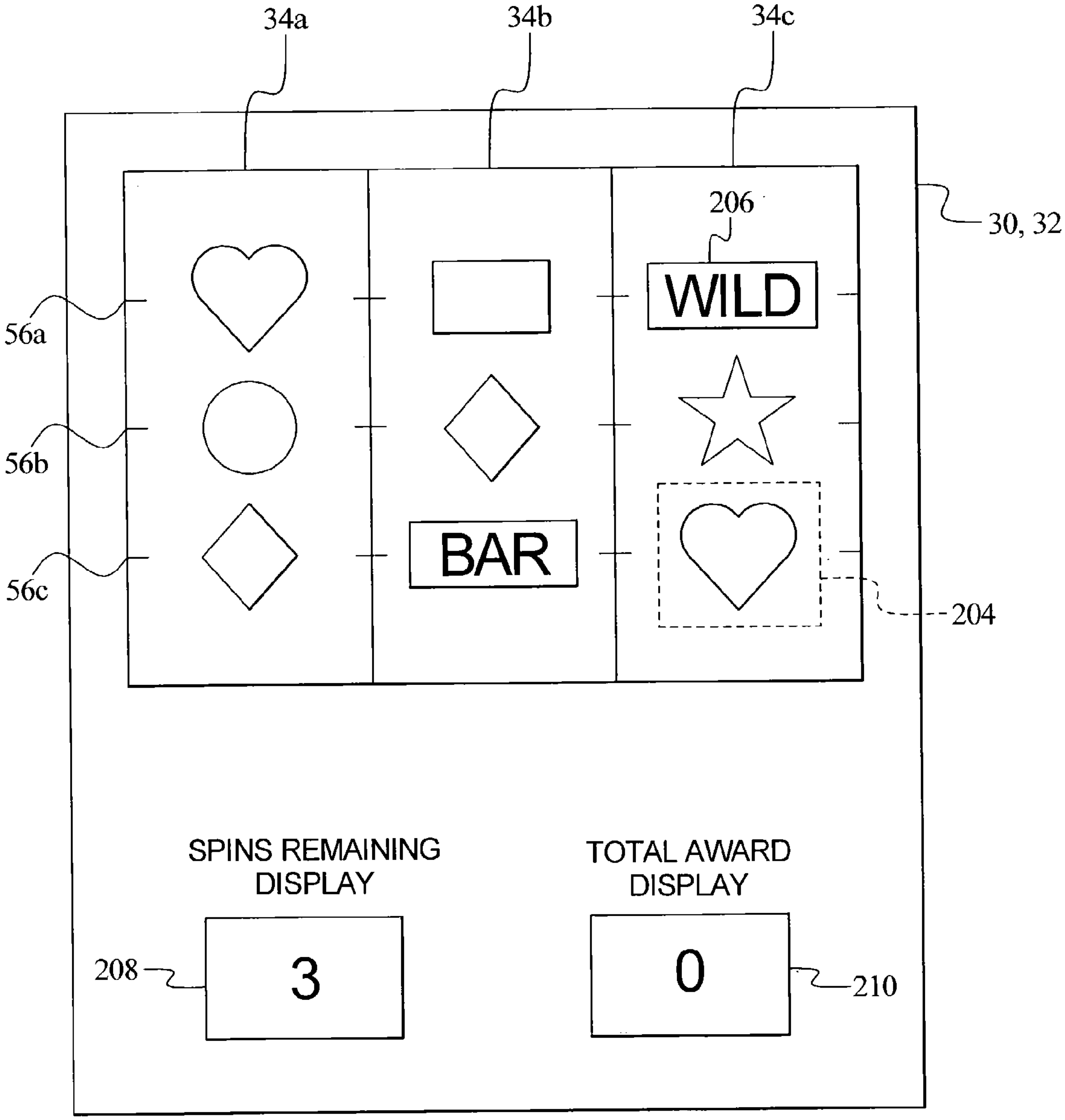
FIG. 13A is an enlarged elevation view of an example of one alternative embodiment of the present invention.

Referring to FIG. 13A, an example of the embodiment of FIG. 12 is illustrated where the gaming device displays a plurality of reels 34*a*, 34*b* and 34*c*. The reels include a plurality of symbols 204 having at least one wild symbol 206. A plurality of awards are associated with specific symbol combinations as indicated in the award summary table 210 in FIG. 13B. The winning symbol combinations 220 are designated in the first column of the award summary table 218. Additionally, the awards 222 associated with each of the specific winning symbol combinations are indicated in the table. In this embodiment, the winning symbol combinations include three matching symbols. It should be appreciated that the winning symbol combinations may include one or more matching symbols or any suitable symbol combinations in a game. In FIG. 13A, three paylines 56*a*, 56*b* and 56*c* are associated with the reels 34. In this example, a winning symbol combination must be indicated on the middle payline or payline 56*b* in the game. The gaming device provides the player with three activations or spins of the reels 34 as indicated by the spins remaining display 208. Also, the player begins the game with a total award of zero as indicated in the total award display 210.

Figure 13B:
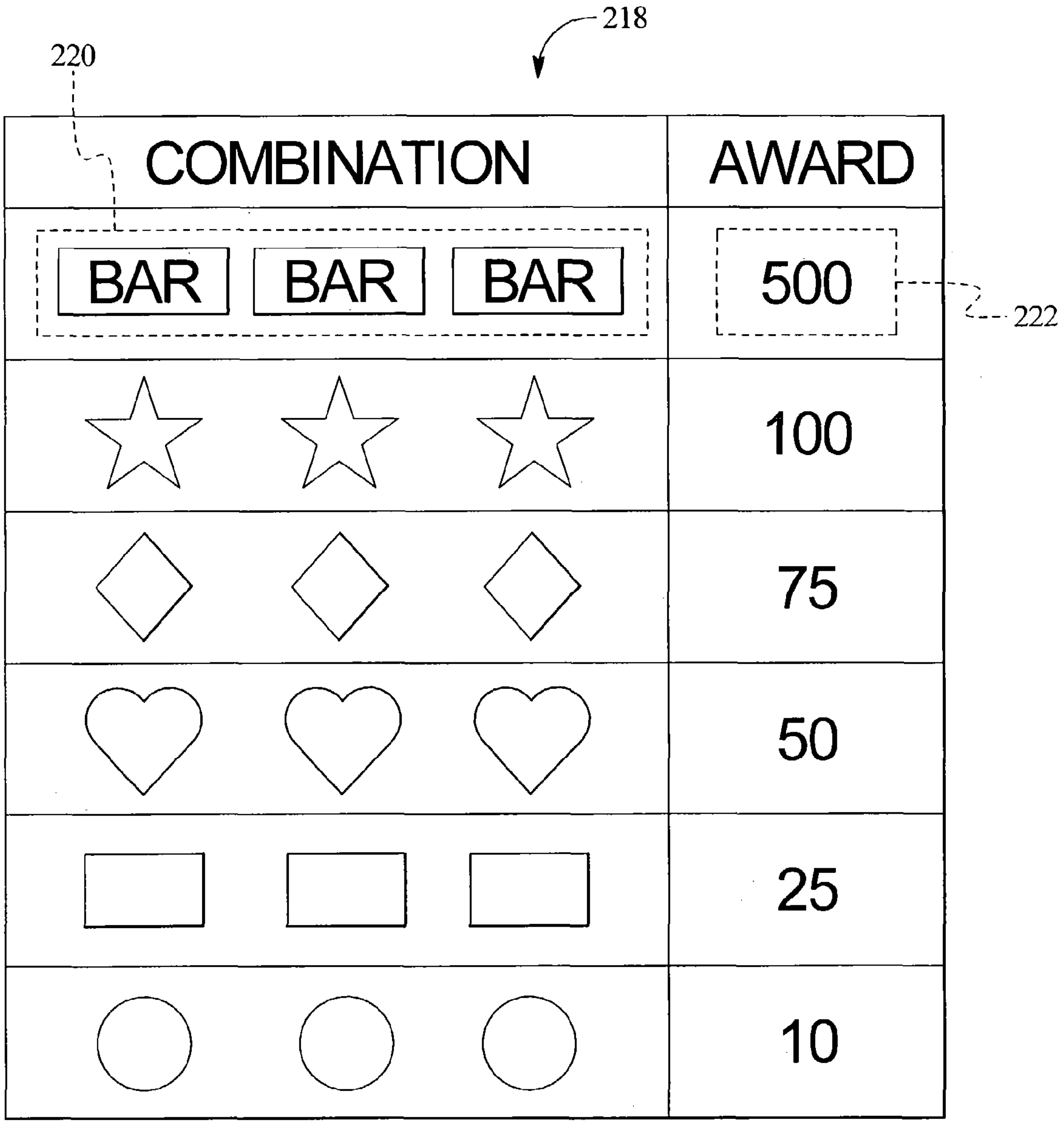
FIG. 13B is award summary table associated with the embodiment of FIG. 13A.
Figure 13C:
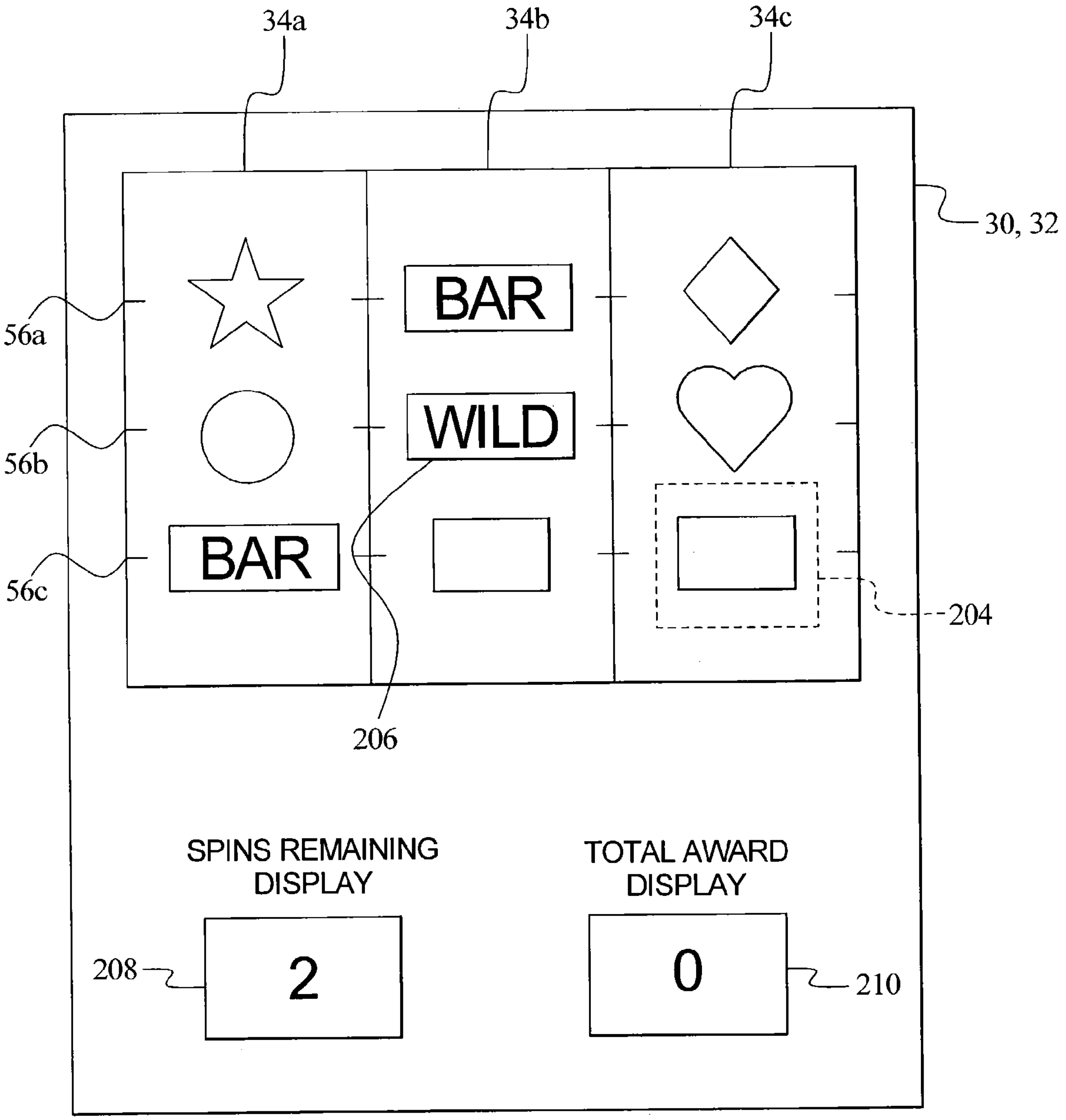
FIGS. 13C, 13D and 13E are enlarged elevation views of the embodiment of FIG. 13A illustrating a game where the gaming device provides a player with three activations of the reels in the game.

Referring to FIG. 13C, the gaming device activates or spins the reels for the first time in the game. After the reels stop spinning, a wild symbol 206 is indicated on payline 56*b*. However, a winning symbol combination, as designated in the award summary table 218 in FIG. 13B, is not indicated on payline 56*b* even though the wild symbol 206 is indicated on the payline. Specifically, the circle symbol, the wild symbol 206, and the heart symbol are indicated on payline 56*b*, which is not a winning symbol combination in the game. Therefore, the gaming device freezes or holds reel 34*b* stationary and thereby enhances the player's opportunity to obtain a winning symbol combination in the game. The gaming device will spin or activate reels 34*a* and 34*c* to indicate symbols on payline 56*b* including the wild symbol 206. The player has two spins remaining as indicated in the spins remaining display 208. The player's total award is zero as indicated in the total award display 210.

Figure 13D:
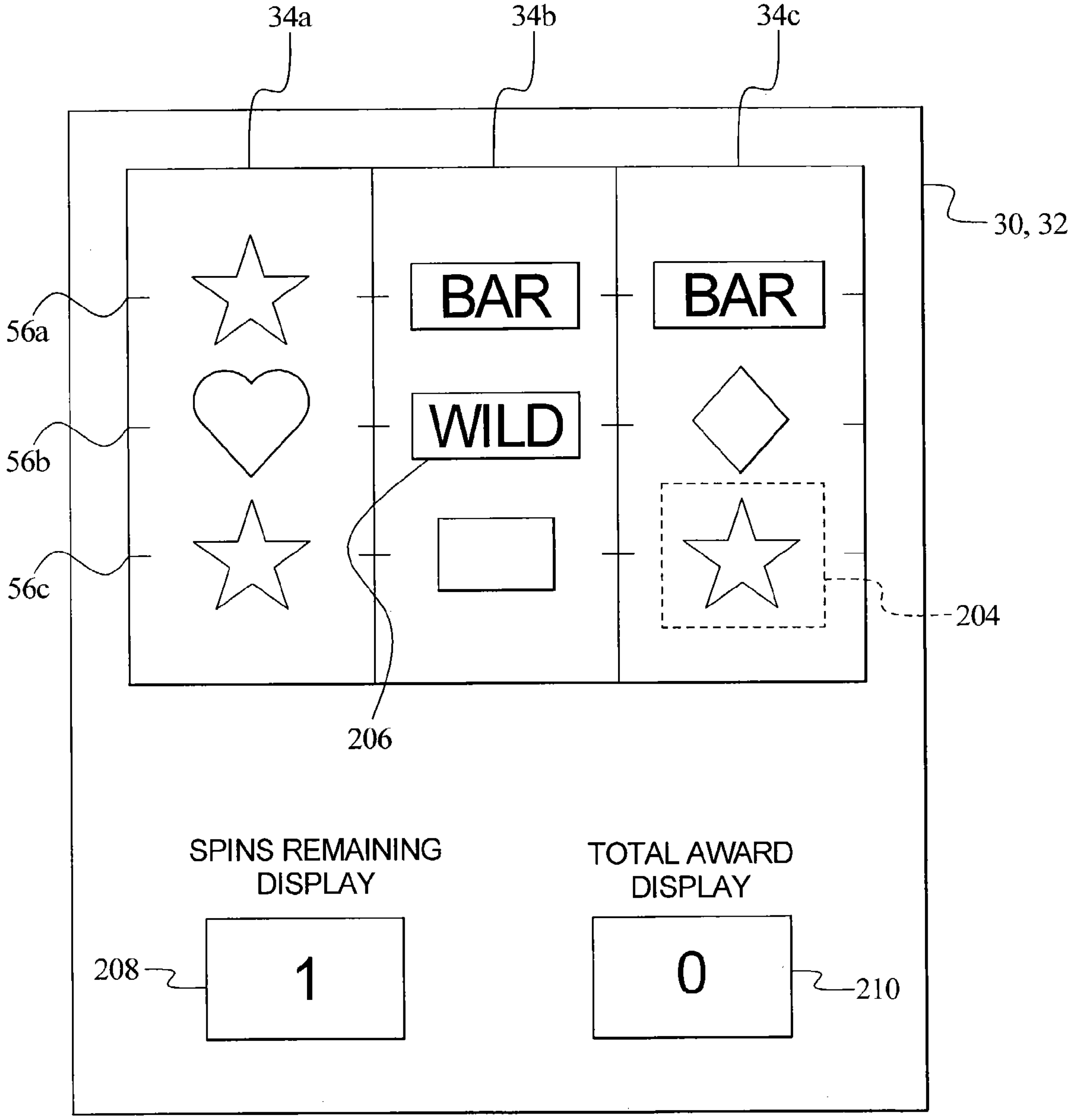
Figure 13E:
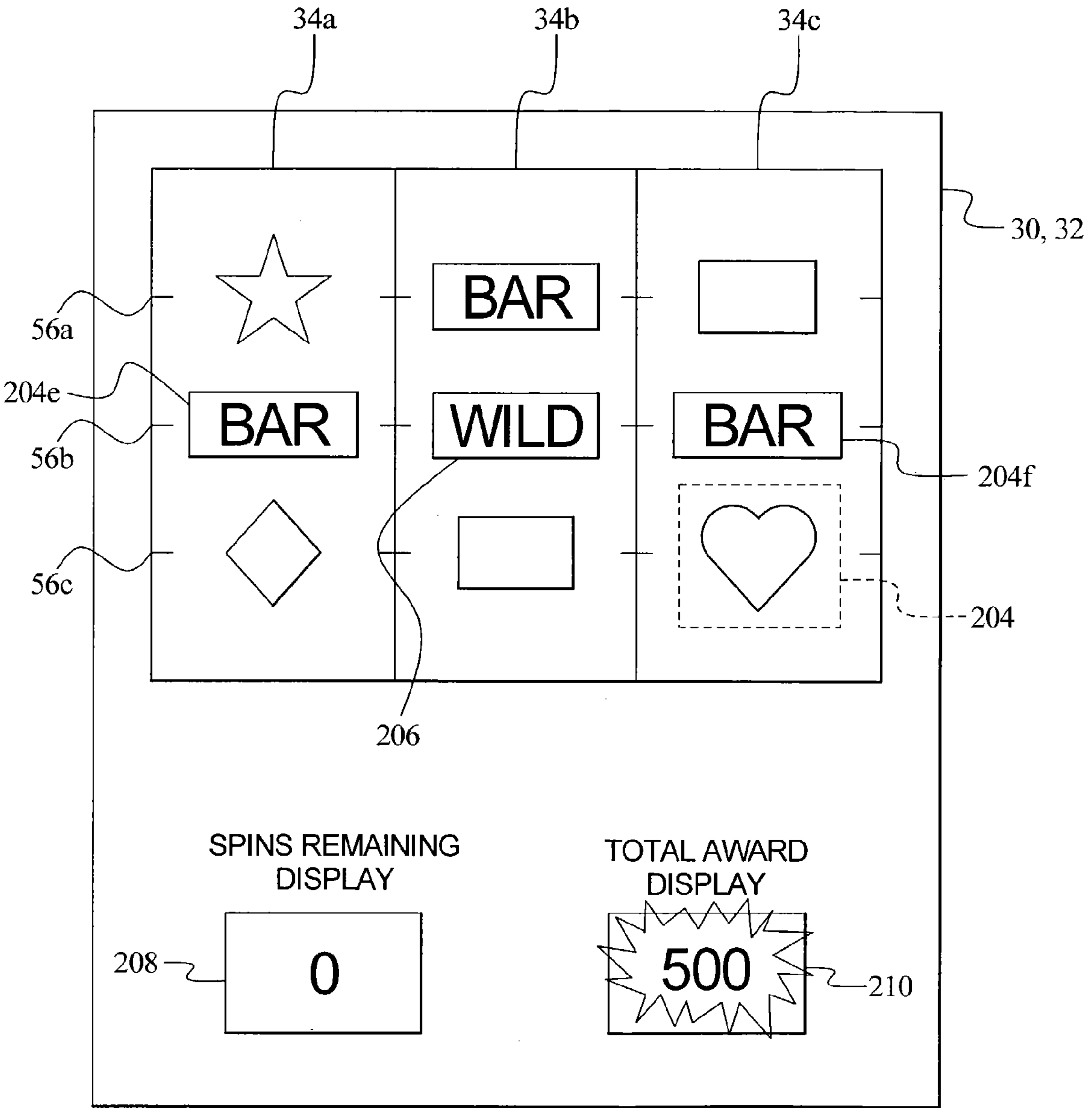

Referring to FIG. 13D, the gaming device activates or spins the reels for a second time in the game. In this activation or spin, the gaming device only activates or spins reels 34*a* and 34*c* because reel 34*b* is held stationary. Thus, the player only needs to obtain two symbols, one on each of the reels 34*a* and 34*c*, on payline 56*b* to obtain a winning symbol combination in the game. After this spin, a heart symbol, a wild symbol 206, and a diamond symbol are indicated on payline 56*b*. This combination of symbols is not a winning symbol combination as illustrated in the award summary table 218 in FIG. 13B. The player now has only one spin remaining in the game as indicated in the spins remaining display 208. Also, the total award is zero as indicated in the total award display 210.

Referring to 13E, the gaming device activates or spins the reels 34 for the last time in the game. The reels stop spinning and indicate a bar symbol 204*a*, a wild symbol 206 and a bar symbol 204*b* on payline 56*b*. Because the wild symbol 206 matches or substitutes for one of the symbols indicated on the same payline as the wild symbol, the wild symbol matches or substitutes as a bar symbol. Thus, the symbol combination indicated on payline 56*b* is three bar symbols. Three bar symbols represent a winning symbol combination in the game as illustrated in FIG. 13B. The gaming device provides the award associated with this winning symbol combination, which is five hundred, and displays that award in the total award display 210. There are no spins remaining in the game as indicated by the spins remaining display 208. Therefore, the gaming device provides the player with the total award indicated in the total award display 210, which is five hundred.

In another alternative embodiment of the present invention, the gaming device freezes or holds one of the reels 34 stationary when a wild symbol is indicated on the reel on a designated payline associated with the reels and the award or awards, if any, associated with any winning symbol combinations occurring on the payline is less than a designated award value in the game. In this embodiment, the gaming device designates an award value in the game. The designated award value defines a minimum award value or base award value to provide to a player in the game. The award value may be any suitable award value as desired by the game implementor, but not exceeding the largest possible award in the game. Furthermore, the designated award value may be predetermined, randomly determined, determined based on a wager made by the player or according to any suitable determination method.

The gaming device activates or spins the reels for a designated number of spins in the game. The gaming device provides the awards associated with any winning symbol combinations indicated on a designated payline associated with the reels. If a wild symbol 206 is indicated on the payline and the award or awards, if any, associated with any winning symbol combinations indicated on the payline is less than the designated award value, the gaming device freezes or holds the reel including the wild symbol stationary and activates the other reels in the game for the remaining number of activations. This provides the player with an enhanced opportunity to obtain an award or awards in the game using the wild symbol because the player needs less symbols to obtain a winning symbol combination in the game. Also, the designated award value insures that if the player does obtain an award in the game, the award will be above a specified award value, which increases the player's excitement and enjoyment of the game.

Figure 14A:
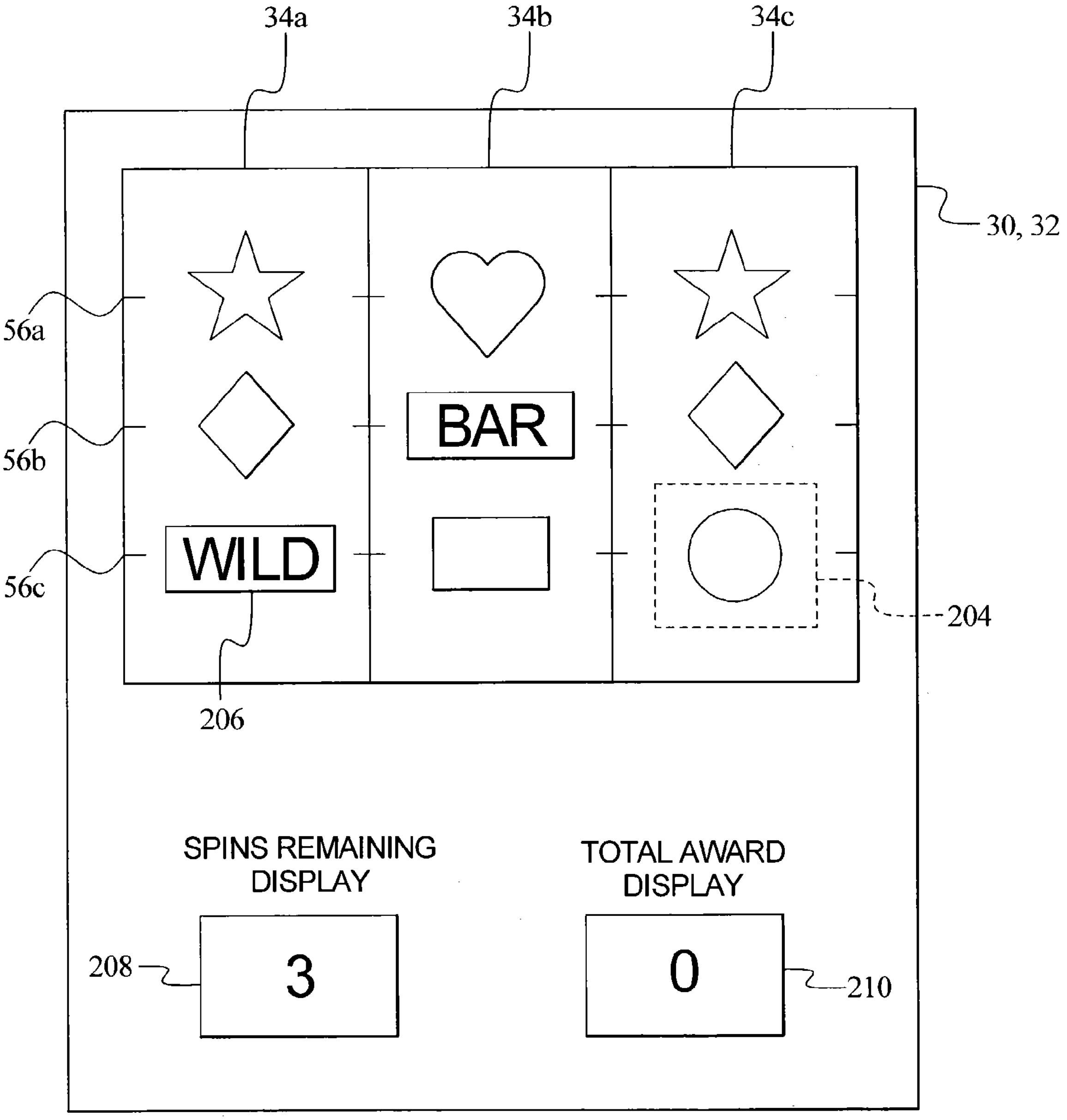
FIG. 14A is an enlarged elevation view of an example of another alternative embodiment of the present invention.

Referring to 14A, 14B, 14C, 14D and 14E, an example of this embodiment is illustrated where the gaming device provides a player with three spins in a game. The gaming device designates an award value or award of fifty as the minimum award value in the game. Therefore, if a wild symbol is indicated on the payline, but a winning symbol combination having an award value of fifty or greater is not indicated on the payline, the gaming device enhances the player's opportunity to obtain a winning symbol combination in the game by holding the reel including the wild symbol stationary for the remainder of the game. The player begins the game with a total award of zero as indicated in the total award 210 in FIG. 14A.

Referring to 14B, an award summary table 224 indicates winning symbol combinations 226 and the awards 228 associated with those winning symbol combinations in the game. In this embodiment, a winning symbol combination includes three matching symbols. However, it should be appreciated that any combination of symbols may be designated as a winning symbol combination in a game. Additionally, any suitable award may be associated with a winning symbol combination in a game.

Figure 14B:
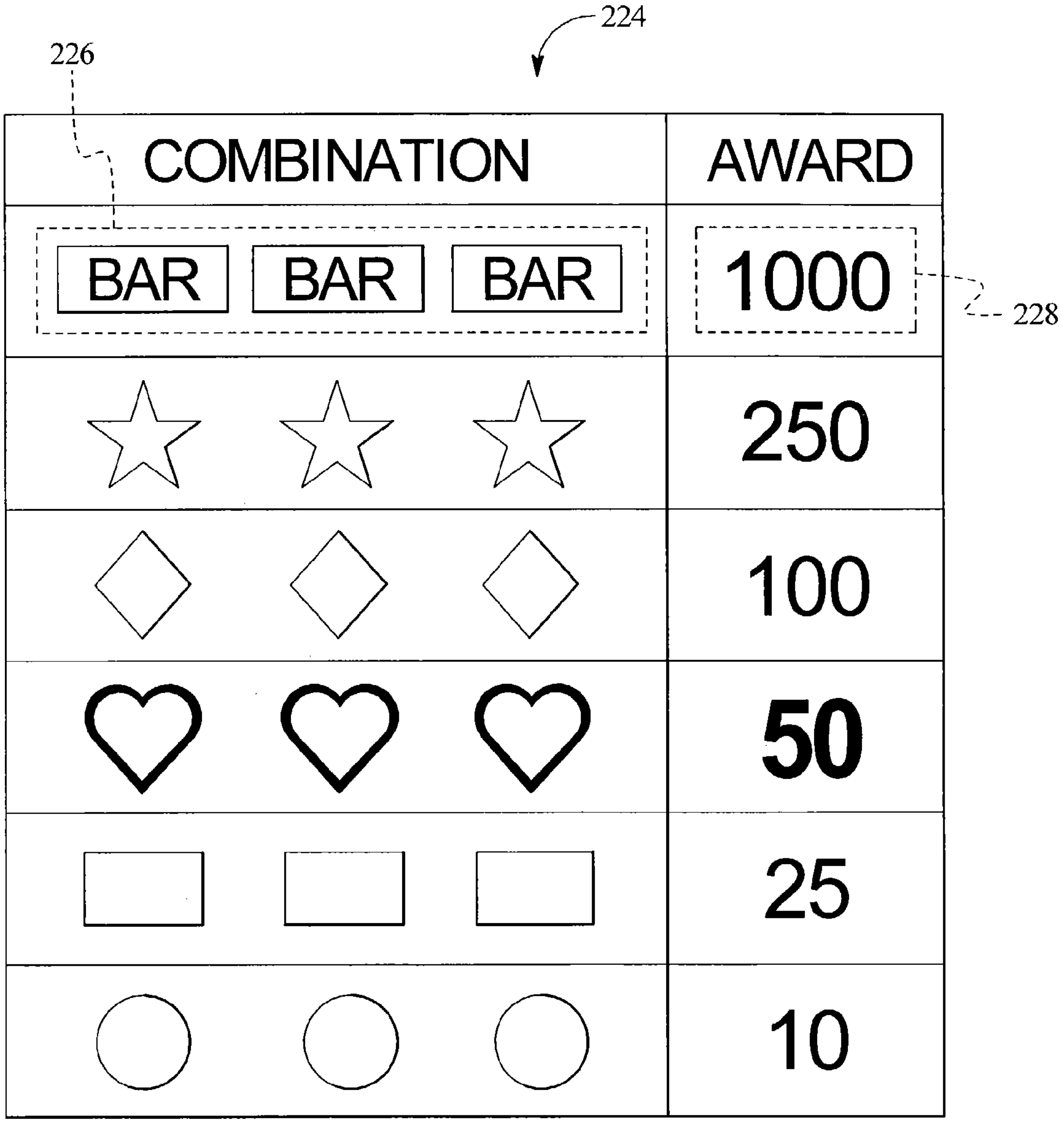
FIG. 14B is an award summary table associated with the embodiment of FIG. 15A.
Figure 14C:
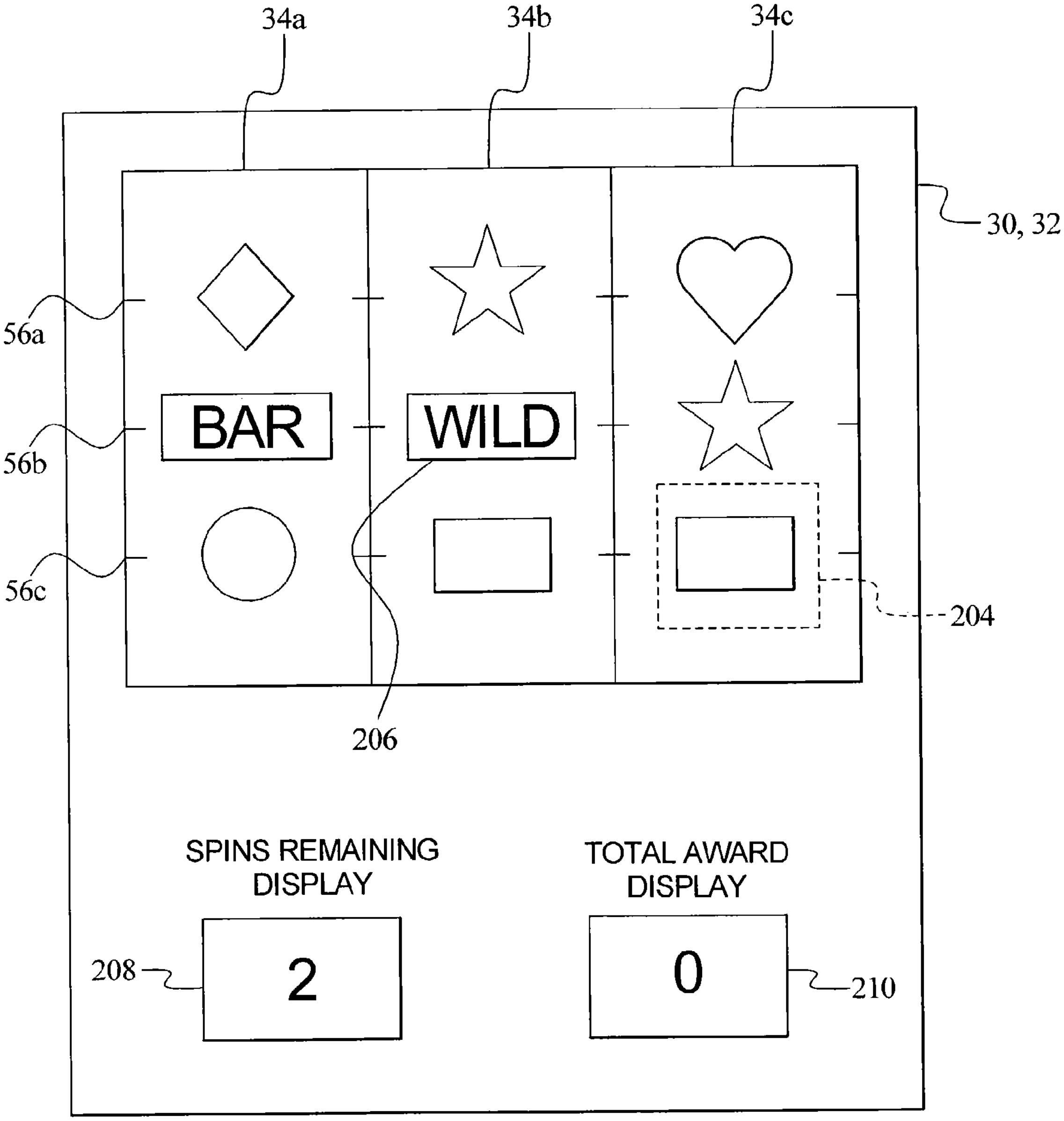
FIGS. 14C, 14D and 14E are enlarged elevation views of the embodiment of FIG. 14A where the gaming device provides three activations of the reels in the game.

Referring to FIG. 14C, the gaming device activates or spins the reels for the first in this game. The reels stop spinning and indicate a bar symbol, a wild symbol 206, and a star symbol on payline 56*b*. Although the player obtained a wild symbol 206 on the payline 56*b*, the player did not obtain a winning symbol combination in the game. Specifically, the player did not obtain a winning symbol combination that included an award greater than the designated award value of fifty as indicated in the award summary table 224 in FIG. 14B. Therefore, the gaming device freezes or holds reel 34*b*, which includes the wild symbol 206, stationary. The gaming device then activates or spins the other reels 34*a* and 34*c* for the remaining number of spins or activations in the game. The player has two activations or spins remaining in the game as indicated in the spins remaining display 208. The total award in the game is still zero as indicated in the total award display 210.

Figure 14D:
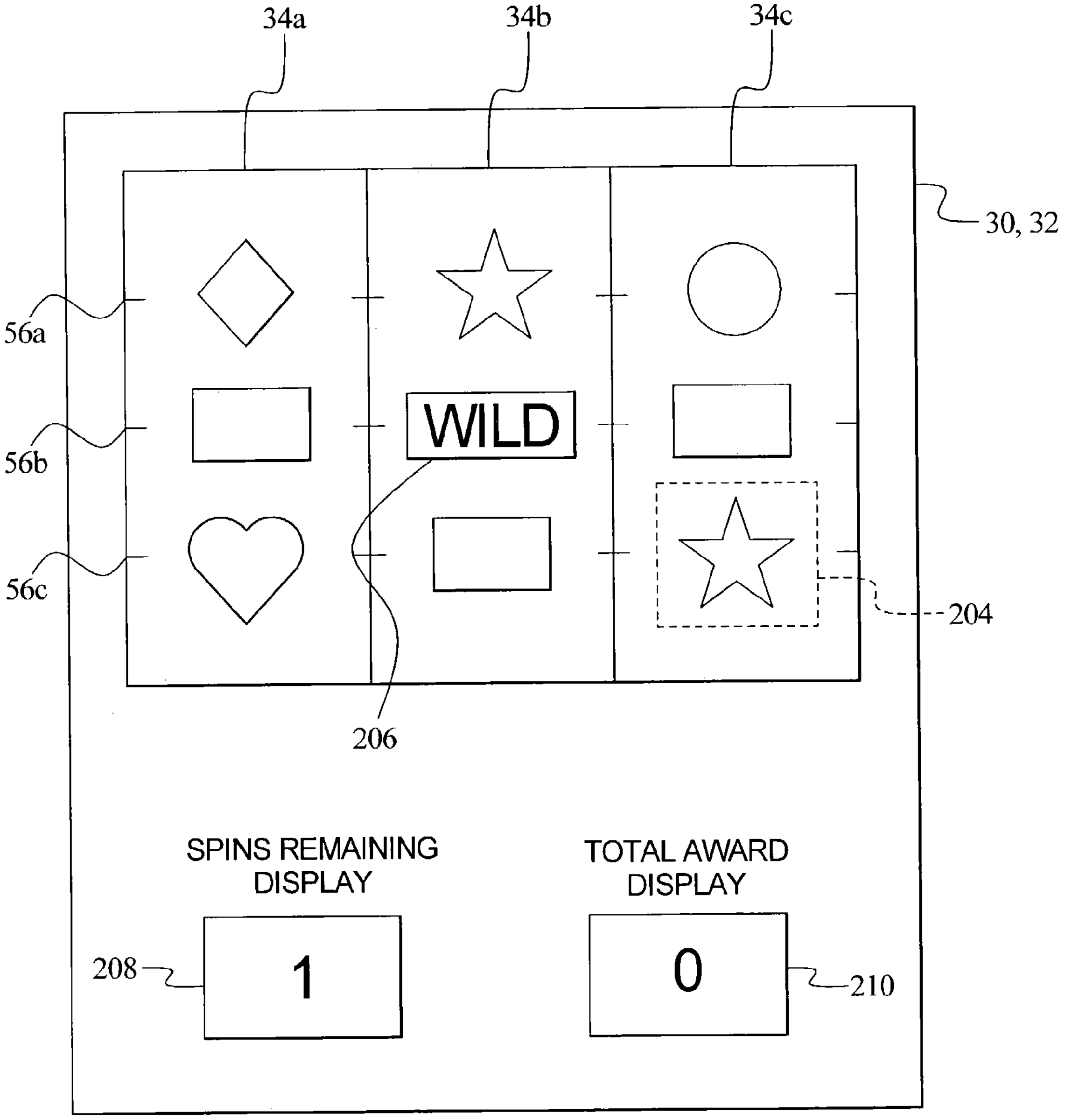

Referring to FIG. 14D, the gaming device activates or spins the reels for a second time in a game. A rectangle symbol, a wild symbol 206 and another rectangle symbol are indicated on payline 56*b*. Because the wild symbol acts or substitutes for one of the symbols indicated on the same payline as the wild symbol, which in this spins is a rectangle symbol, a combination of three rectangle symbols is indicated on the payline. This symbol combination, however, does not include an award value greater than the designated award value of fifty as indicated in the award summary table 224 in FIG. 14B. Specifically, an award of twenty-five is associated with the symbol combination including three rectangle symbols, which is less than the designated award value of fifty. However, the gaming device continues to activate or spin the reels in the game. The player now has one spin remaining in the game as indicated by the spins remaining display 208. Furthermore, the total award in the game is zero as indicated by the total award display 210.

Figure 14E:
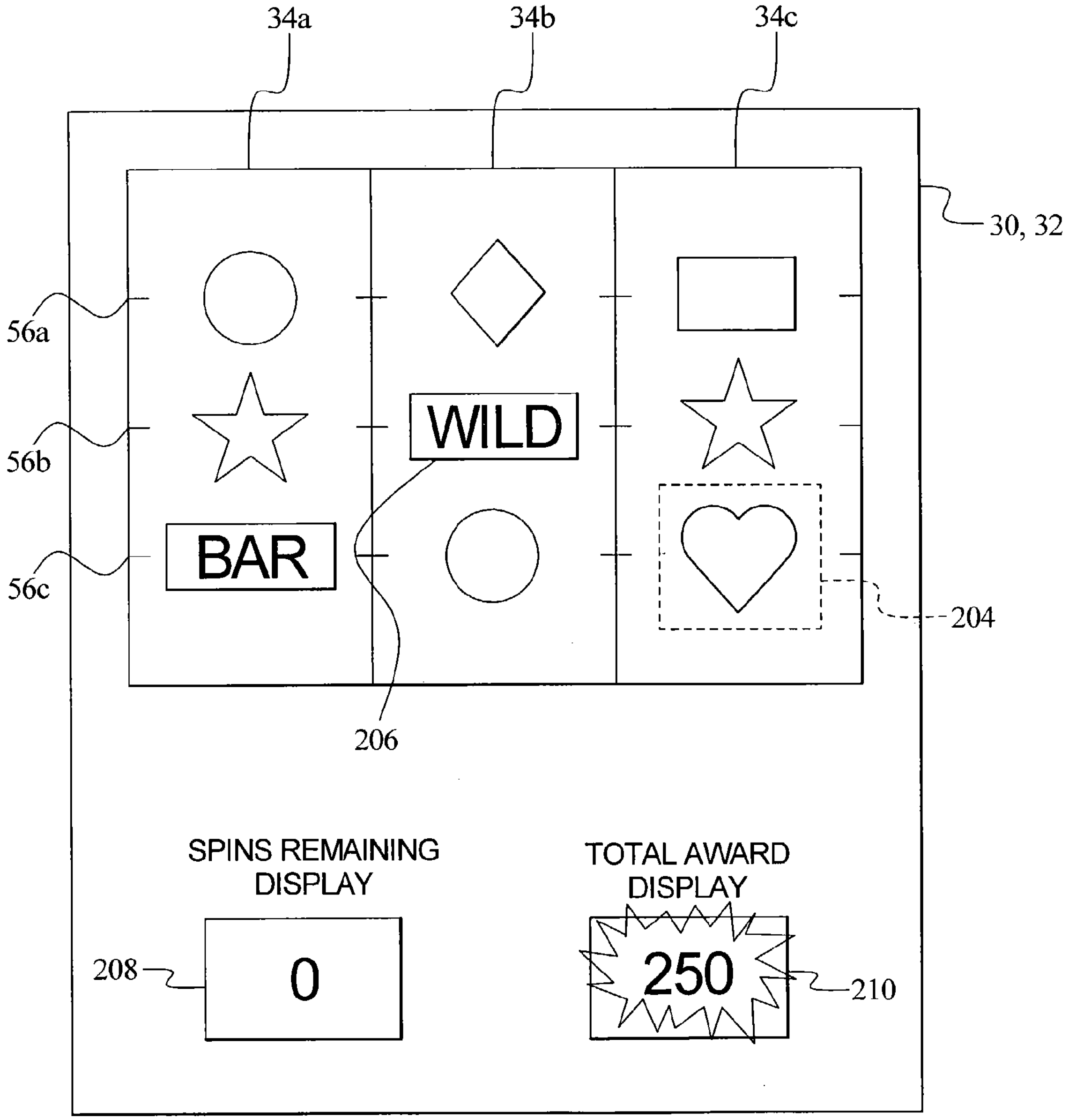

Referring to FIG. 14E, the gaming device spins or activates the reels for the final time in the game. In this spin, a star symbol, a wild symbol 206 and another star symbol are indicated on payline 56*b*. An award of two-hundred fifty is associated with a winning symbol combination including three star symbols as indicated in the award summary table 224. The award value of two-hundred fifty is greater than the designated award value of fifty. Thus, the gaming device provides this award to the player in the game. The award of two-hundred fifty is transferred to the total award display as indicated by the total award display 210. The player does not have any spins remaining in the game as indicated by the spins remaining display 208. The gaming device therefore provides the total award of two-hundred fifty as indicated in the total award display 210 to the player and the game ends.

In a further alternative embodiment, after the gaming device freezes or holds one of the reels 34 stationary when a wild symbol is indicated on the reels, the gaming device activates or spins the reels, other than the held reel, for a designated number of spins in the game and provides an award or awards associated with any winning symbol combinations including the wild symbol indicated on any of the paylines associated with the reels (i.e., a scatter pay combination). For example in FIG. 14E, if one of the star symbols is located on payline 56*a* and the other star symbol is located on payline 56*c*, the gaming device provides the award associated with a winning symbol combination including three star symbols (i.e., two star symbols and the wild symbol) because the winning combination of symbols including the wild symbol occurred on the reels. It should be appreciated that the winning symbol combination including the wild symbol may include any winning combination of symbols on the reels including the reel having the wild symbol. This embodiment provides the player with a greater opportunity to obtain an award or awards in a game using the wild symbol because the player can obtain a winning symbol combination on any of the reels, instead of on a designated payline or paylines.

Figure 15:
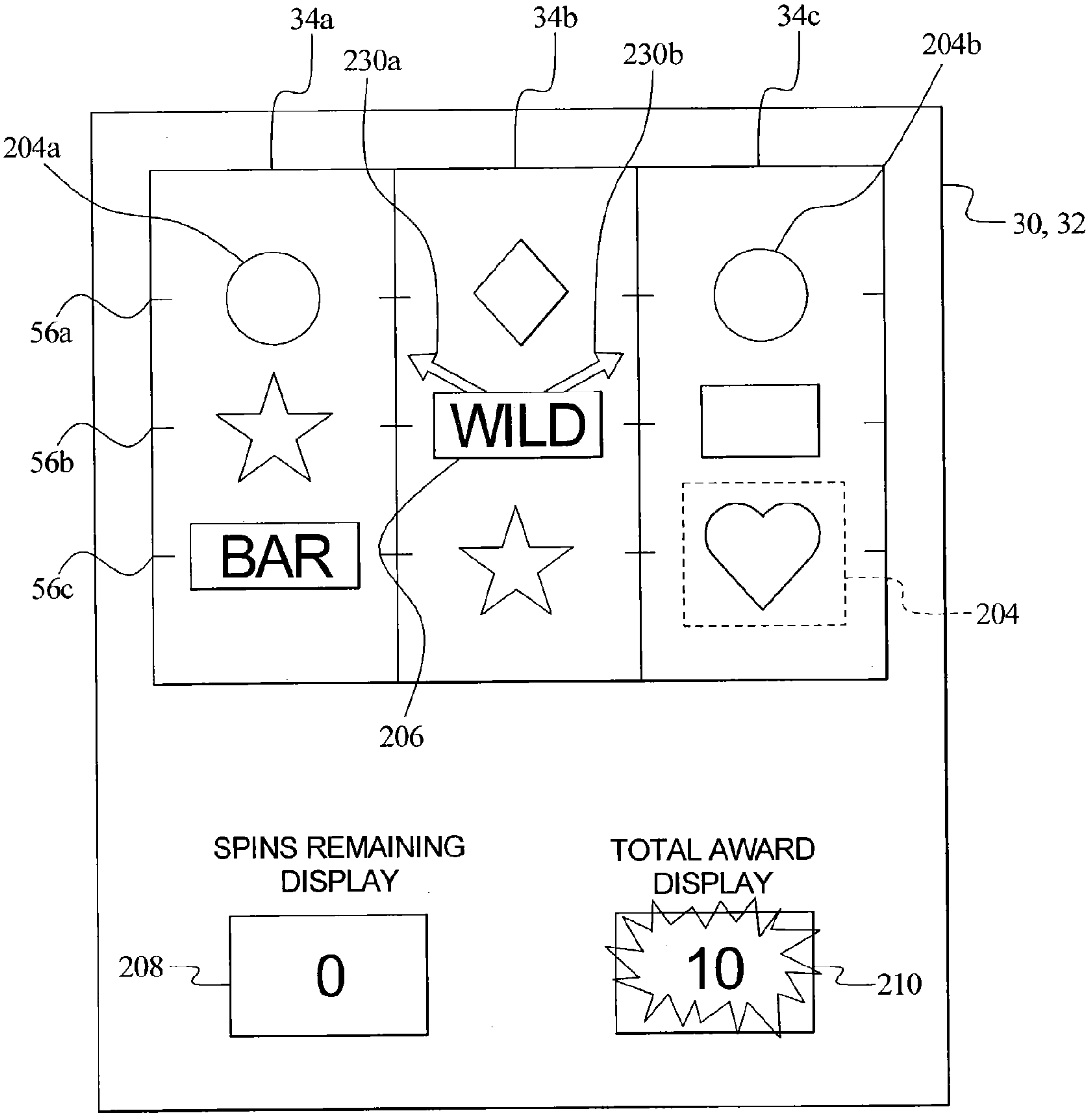
FIG. 15 is an enlarged elevation view of another alternative embodiment of the present invention where the wild symbol includes two symbol indicators.

Referring to FIG. 15 in another alternative embodiment, the wild symbol includes at least one symbol indicator 230 which points to or indicates one or more symbols on the reels in the scatter pay combination embodiment described above. In one aspect of this embodiment, the indicator or indicators are stationary and point to a fixed location or locations on the reels. For example in FIG. 15, the wild symbol 206 includes two indicators which are in the form of arrows 230*a* and 230*b*. Indicator 230*a* points to the symbol location on reel 34*a*, which is associated with payline 56*a*. Indicator 230*b* points to the symbol location on reel 34*c*, which is associated with payline 56*a*. It should be appreciated that the indicators may be arrows, pointers or any other suitable indicator. It should also be appreciated that the wild symbol may include one or more indicators and the indicators may point to any suitable location or locations on the reels. In this example, the reel including the wild symbol is held stationary while the other reels (i.e., the reels not including the wild symbol) are activated. The reels stop and the indicators 230*a* and 230*b* associated with the wild symbol point to the circle symbol 204*a* and another circle symbol 204*b*. Thus, the gaming device provides an award associated with a winning symbol combination including three circle symbols (i.e., two circle symbols and the wild symbol). It should be appreciated that the indicators may indicate or point to a randomly selected location on the reels or a designated section on the reels.

In a further alternative embodiment of the present invention, the symbols on the reels include at least one bonus symbol. When the bonus symbol is indicated on one or more designated paylines in a game, the gaming device provides an additional award or bonus award in the game. The bonus award associated with the bonus symbol may be at least one free spin of the reels, at least one free game and/or at least one multiplier. It should be appreciated that the bonus award may be any suitable award as desired by the game implementor. The bonus award enables a player to obtain additional awards or additional spins of the reels in a game, which further enhances the player's excitement and enjoyment of the game.

In another alternative embodiment, a probability of being indicated on one or more paylines associated with the reels is associated with each of the symbols on the reels. In one embodiment, the probability associated with the wild symbol is less than at least one of the probabilities associated with the other symbols on the reels. In another embodiment, the probability associated with the wild symbol is less than a plurality of the probabilities associated with the other symbols on the reels. In a further embodiment, the probability associated with the wild symbol is less than all of the probabilities associated with the other symbols on the reels. It should be appreciated that the probabilities associated with the symbols may be any suitable probabilities as desired by the game implementor.

In a further alternative embodiment, the present invention is employed in a card game such as a video poker game. In this embodiment, the gaming device display a plurality of cards to a player. The cards include a plurality of symbols including at least one wild symbol The symbols may be any suitable symbols such as numbers, colors, letters, playing card suits, images or any other suitable symbols or images. If a card includes a wild symbol but a winning combination of cards is not indicated, the gaming device holds the card including the wild symbol. The gaming device then replaces at least one of the cards for a designated number of rounds. The number of rounds may be predetermined, randomly determined, determined based on a wager by a player or according to any suitable determination method. Thus, the gaming device provides the player with additional opportunities to win awards related to the wild symbol on the cards. In one embodiment, the gaming device replaces one or more of the cards in the rounds until a winning combination of cards is indicated. In another embodiment, the gaming device replaces one or more of the cards until there are no rounds remaining in the game. In this embodiment, the gaming device enables the player to obtain one or more awards in the game. In a further embodiment as described above, the gaming device holds the card including the wild symbol when the wild symbol appears on the card and the award amount associated with the combination of symbols indicated by the cards is not greater than a designated award amount.

Figure 16:
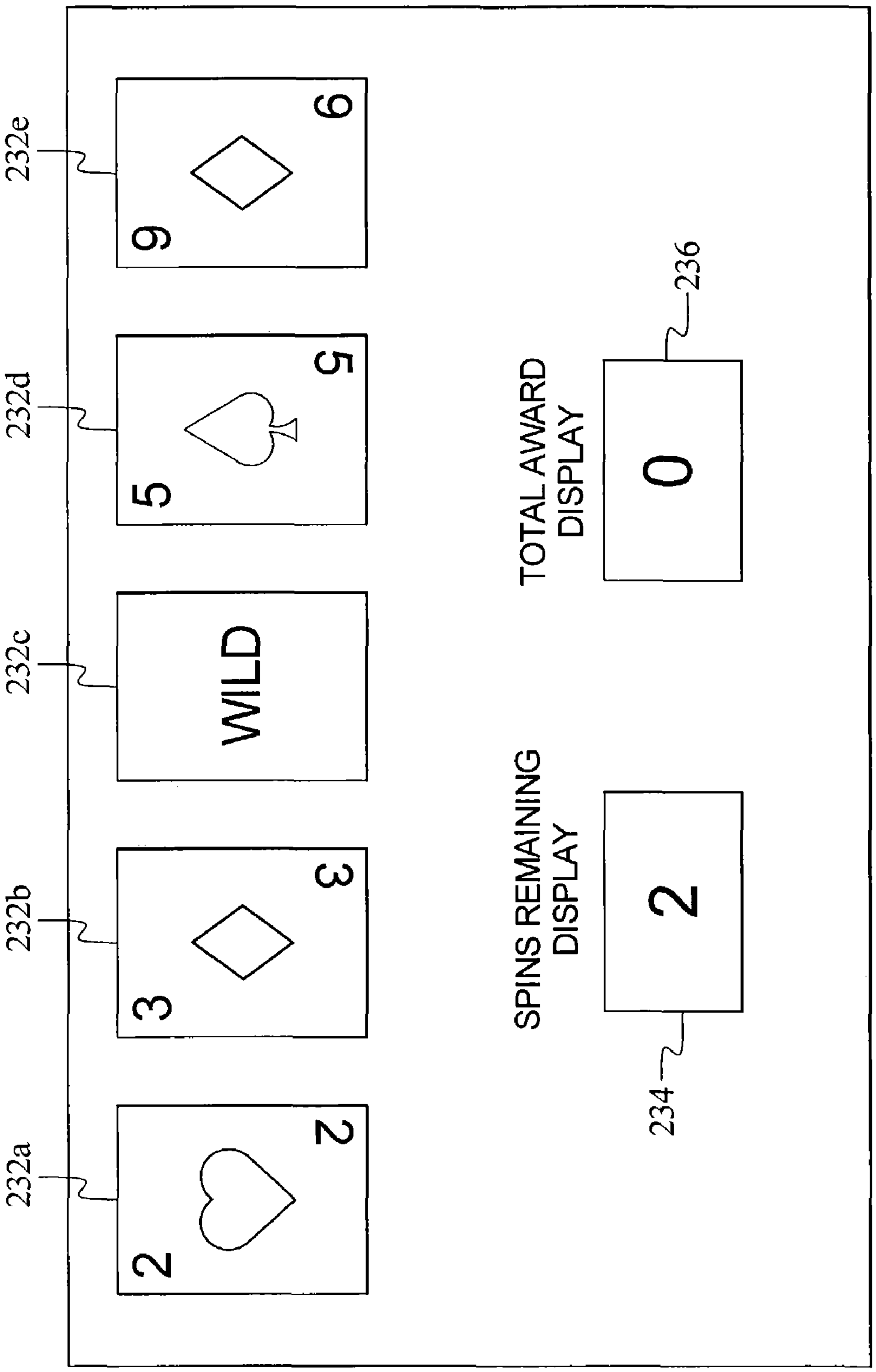
FIG. 16 is an enlarged elevation view of a further alternative embodiment of the present invention where a plurality of cards are displayed to a player.

Referring to FIG. 16, the above embodiment is illustrated where the gaming device displays five cards to the player in the game. The cards include a two of hearts (232*a*), a three of diamonds (232*b*), a wild symbol card (232*c*), a five of spades (232*d*) and a nine of diamonds (232*e*). In this example, a pair of matching cards is not a winning combination of cards. Therefore, the combination of cards displayed in FIG. 16 does not produce a winning combination of cards in the game. Because a wild symbol appears on one of the cards, card 232*c*, and there are no winning combinations of cards in the game, the gaming device holds card 232*c*. The gaming device then replaces at least one of the cards, other than the card including the wild symbol (232*c*), until a winning combination of cards is indicated such as three matching cards (i.e., three of a kind), or until there are no rounds remaining in the game. The gaming device then provides the player with the award associated with the winning combination of cards in the game as indicated by the total award display 236.

It should be appreciated that the present invention may be employed in a primary game, a bonus game, free spins game, a sub-game or in any suitable game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels;

a plurality of symbols including at least one wild symbol on the reels; and at least one winning symbol combination, wherein if after the reels are activated to determine a plurality of said symbols, said determined symbols:

(i) include a wild symbol but no winning symbol combination on the reels including that wild symbol, or (ii) do not form a winning symbol combination including the wild symbol that provides an award having an award amount equal to or greater than a designated award amount, then at least one of the reels other than the reel having the wild symbol is re-activated for a designated number of activations and an award is provided to a player if one of the winning symbol combinations occurs on the reels during any of said re-activations.

2. The gaming device of claim 1, wherein the designated award amount is predetermined.

3. The gaming device of claim 1, wherein the designated award amount is determined based on a wager made by the player.

4. The gaming device of claim 1, wherein the designated award amount includes at least one award associated with the winning symbol combinations.

5. The gaming device of claim 1, which includes a payline associated with the reels, wherein if after the reels are activated to determine a plurality of said symbols, said determined symbols:

(i) include a wild symbol but no winning symbol combination on the payline including that wild symbol, or (ii) do not form a winning symbol combination including the wild symbol on the payline that provides an award having an award amount equal to or greater than the designated award amount, then at least one of the reels other than the reel having the wild symbol is re-activated for the designated number of activations and an award is provided to a player if one of the winning symbol combinations occurs on the payline during any of said re-activations.

6. The gaming device of claim 1, which includes a plurality of paylines associated with the reels, wherein if after the reels are activated to determine a plurality of said symbols, said determined symbols:

(i) include a wild symbol but no winning symbol combination on one of the paylines including that wild symbol, or (ii) do not form a winning symbol combination including the wild symbol on one of the paylines that provides an award having an award amount equal to or greater than the designated award amount, then at least one of the reels other than the reel having the wild symbol is re-activated for the designated number of activations and an award is provided to a player if one of the winning symbol combinations occurs on one of the paylines during any of said re-activations.

7. The gaming device of claim 1, wherein the symbols include a plurality of wild symbols.

8. The gaming device of claim 1, wherein the designated number of activations is predetermined.

9. The gaming device of claim 1, wherein the designated number of activations is determined based on a wager made by the player.

10. The gaming device of claim 1, wherein the symbols include at least one of the following: numbers, letters, characters, multipliers, game elements and images.

11. The gaming device of claim 1, wherein the symbols include at least one bonus symbol.

12. The gaming device of claim 11, wherein an outcome associated with the bonus symbol includes at least one of the following: at least one free spin, at least one free game and at least one multiplier.

13. The gaming device of claim 1, wherein the wild symbol includes at least one indicator which indicates at least one symbol on the reels, wherein any winning symbol combinations on the reels include at least the wild symbol and the symbol indicated by the indicator.

14. A gaming device comprising:

a plurality of reels;

a plurality of symbols including at least one wild symbol on the reels;

at least one winning symbol combination; and a processor operable to activate the reels and wherein if after said reels are activated, at least one of the reels includes:

(i) the wild symbol, but no winning symbol combinations on the reels including the wild symbol, or (ii) the wild symbol, but no winning symbol combinations including the wild symbol provide an award having an award amount equal to or greater than a designated award amount, then the reel including the wild symbol is held stationary while the reels other than the stationary reel are re-activated for a designated number of activations, wherein an award is provided to a player when any winning symbol combinations occur on the reels.

15. The gaming device of claim 14, wherein the designated award amount is predetermined.

16. The gaming device of claim 14, wherein the designated award amount is determined based on a wager made by the player.

17. The gaming device of claim 14, wherein the designated award amount is randomly determined.

18. The gaming device of claim 14, which includes a payline associated with the reels, wherein if after said reels are activated, at least one of the reels includes (i) the wild symbol, but no winning symbol combinations including the wild symbol occur on the payline, or (ii) the wild symbol, but no winning symbol combinations including the wild symbol occur on the payline that provide an award having an award amount equal to or greater than the designated award amount, then the reel including the wild symbol is held stationary while the reels other than the stationary reel are re-activated for the designated number of activations, wherein an award is provided to a player when any winning symbol combinations occur on the payline.

19. The gaming device of claim 14, which includes a plurality of paylines associated with the reels, wherein if after said reels are activated, at least one of the reels includes (i) the wild symbol, but no winning symbol combinations including the wild symbol occur on one of the paylines, or (ii) the wild symbol, but no winning symbol combinations including the wild symbol occur on one of the paylines that provide an award having an award amount equal to or greater than a designated award amount, then the reel including the wild symbol is held stationary while the reels other than the stationary reel are re-activated for a designated number of activations, wherein an award is provided to a player when any winning symbol combinations occur on one of the paylines.

20. The gaming device of claim 14, wherein the symbols include a plurality of wild symbols.

21. The gaming device of claim 14, wherein the designated number of activations is predetermined.

22. The gaming device of claim 14, wherein the designated number of activations is determined based on a wager made by the player.

23. The gaming device of claim 14, wherein the designated number of activations is randomly determined.

24. The gaming device of claim 14, wherein a probability associated with the wild symbol is less than a probability associated with at least one of the other symbols on the reels.

25. The gaming device of claim 14, wherein the probability associated with the wild symbol is less than probabilities associated with a plurality of the other symbols on the reels.

26. The gaming device of claim 14, wherein a probability associated with the wild symbol is less than probabilities associated with all of the other symbols on the reels.

27. The gaming device of claim 14, wherein the wild symbol includes at least one indicator which indicates at least one symbol on the reels, wherein any winning symbol combinations on the reels include at least the wild symbol and the symbol indicated by the indicator.

28. A gaming device comprising:

a wagering game;

a plurality of reels; and a plurality of symbols on said reels, said symbols including at least one wild symbol, wherein if the wild symbol occurs on one of the reels in the game and:

(i) a win involving the wild symbol does not occur on the reels, or (ii) a win at a designated level involving the wild symbol does not occur on the reels, then the reel including the wild symbol is held stationary, at least one additional symbol from the plurality of symbols is generated in association with the wild symbol and an award is provided to a player for any wins based on the combination of the wild symbol and the additional symbol or symbols generated on the reels.

29. The gaming device of claim 28, wherein the additional symbol includes a wild symbol.

30. A gaming device comprising:

a plurality of reels;

a plurality of symbols including a plurality of wild symbols on the reels; and at least one winning symbol combination, wherein if after the reels are activated to randomly determine a plurality of said symbols, said symbols include a wild symbol but no winning combination of symbols on the reels including that wild symbol, then at least one of the reels other than the reel having the wild symbol is re-activated for a designated number of activations and an award is provided to a player if one of the winning symbol combinations occurs on the reels during any of said re-activations.

31. The gaming device of claim 30, wherein one of the reels including one of the plurality of wild symbols is held stationary when the award amount associated with an award for any winning symbol combinations occurring on the reels including said wild symbol is less than a designated award amount greater than zero.

32. The gaming device of claim 31, wherein the designated award amount is predetermined.

33. The gaming device of claim 31, wherein the designated award amount is determined based on a wager made by the player.

34. The gaming device of claim 31, wherein the designated award amount includes at least one award associated with the winning symbol combinations.

35. The gaming device of claim 30, which includes a payline associated with the reels wherein one of the reels including at least one of the plurality of wild symbols is held stationary when no winning symbol combinations occur on the payline including the wild symbol, at least one of the reels other than the stationary reel is re-activated for a designated number of activations and an award is provided to the player when any of the winning symbol combinations occur on the payline associated with the reels.

36. The gaming device of claim 30, which includes a plurality of paylines associated with the reels wherein one of the reels including a wild symbol is held stationary when no winning symbol combinations occur on the payline including the wild symbol, at least one of the reels other than the stationary reel is re-activated for a designated number of activations and an award is provided to the player when any winning symbol combination occurs on the payline.

37. The gaming device of claim 30, wherein the designated number of activations is predetermined.

38. The gaming device of claim 30, wherein the designated number of activations is determined based on a wager made by the player.

39. The gaming device of claim 30, wherein the symbols include at least one of the following: numbers, letters, characters, multipliers, game elements and images.

40. The gaming device of claim 30, wherein the symbols include at least one bonus symbol.

41. The gaming device of claim 40, wherein an outcome associated with the bonus symbol includes at least one of the following: at least one free spin, at least one free game and at least one multiplier.

42. A method of operating a gaming device, the method comprising the steps of:

(a) displaying a plurality of reels including a plurality of symbols, said symbols including at least one wild symbol;

(b) holding one of the reels stationary if:

(i) the wild symbol occurs on said reel and no winning symbol combinations including the wild symbol occur on the reels, or (ii) the wild symbol occurs on said reel and no winning symbol combinations including the wild symbol occur on the reels that provide an award having an award amount greater than a designated award amount;

(c) activating the reels other than the reel including the wild symbol for a designated number of activations of the reels when the reel including the wild symbol is held stationary; and (d) providing an award to a player for any winning symbol combinations that occur on the reels until there are no activations remaining.

43. The method of claim 42, which includes the step of predetermining the designated award amount.

44. The method of claim 42, which includes the step of randomly determining the designated award amount.

45. The method of claim 42, which includes the step of determining the designated award amount based on a wager made by the player.

46. The method of claim 42, wherein the step of holding one of the reels stationary includes holding one of the reels stationary when the wild symbol occurs on at least one payline associated with the reels and no winning symbol combinations occur on said payline.

47. The method of claim 42, which includes the step of predetermining the designated number of activations.

48. The method of claim 42, which includes the step of randomly determining the designated number of activations.

49. The method of claim 42, which includes the step of determining the designated number of activations based on a wager made by the player.

50. The method of claim 42, wherein the symbols include at least one bonus symbol.

51. The method of claim 50, which includes at least one of the steps of providing at least one free spin, at least one free game and at least one multiplier when the bonus symbol occurs on the reels.

52. The method of claim 42, which includes the step of indicating at least one symbol on the reels using at least one indicator associated with the wild symbol, wherein any winning symbol combinations on the reels include at least the wild symbol and the symbol indicated by the indicator.

53. The method of claim 42, wherein the steps (a) to (d) are provided to the player through a data network.

54. The method of claim 53, wherein the data network is an internet.

* * * * *